United States Patent
Gur

(10) Patent No.: US 11,800,084 B2
(45) Date of Patent: Oct. 24, 2023

(54) WEARABLE VIRTUAL RETINAL DISPLAY

(71) Applicant: Eyejets Ltd, Kidron (IL)

(72) Inventor: Joshua Gur, Jerusalem (IL)

(73) Assignee: EYEJETS LTD., Kidron (IL)

(*) Notice: Subject to any disclaimer, the term of this patent is extended or adjusted under 35 U.S.C. 154(b) by 0 days.

(21) Appl. No.: 17/647,476

(22) Filed: Jan. 10, 2022

(65) Prior Publication Data

US 2023/0224453 A1  Jul. 13, 2023

(51) Int. Cl.
| | | |
|---|---|---|
| *H04N 13/383* | (2018.01) | |
| *G02B 27/01* | (2006.01) | |
| *G06T 19/00* | (2011.01) | |
| *H04N 13/117* | (2018.01) | |
| *H04N 13/332* | (2018.01) | |
| *G06F 3/01* | (2006.01) | |
| *H04N 13/00* | (2018.01) | |

(52) U.S. Cl.
CPC ....... *H04N 13/383* (2018.05); *G02B 27/0172* (2013.01); *G06T 19/006* (2013.01); *H04N 13/117* (2018.05); *H04N 13/332* (2018.05); *G06F 3/013* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 10,078,377 B2 * | 9/2018 | Balan | G06T 19/006 |
| 2016/0026253 A1 * | 1/2016 | Bradski | H04N 13/128 |
| | | | 345/8 |
| 2019/0094981 A1 * | 3/2019 | Bradski | G06F 3/017 |
| 2020/0258481 A1 * | 8/2020 | Woo | G06F 3/04815 |
| 2021/0307605 A1 | 10/2021 | Gur | |
| 2023/0032771 A1 * | 2/2023 | Zion | G02B 27/017 |

* cited by examiner

*Primary Examiner* — Michael J Cobb
(74) *Attorney, Agent, or Firm* — The Roy Gross Law Firm, LLC; Roy Gross

(57) ABSTRACT

Disclosed are a method and an input device for inputting information such as user commands to a computer a person wearing a virtual retinal display device that allows the person to concurrently see the real world.

13 Claims, 18 Drawing Sheets

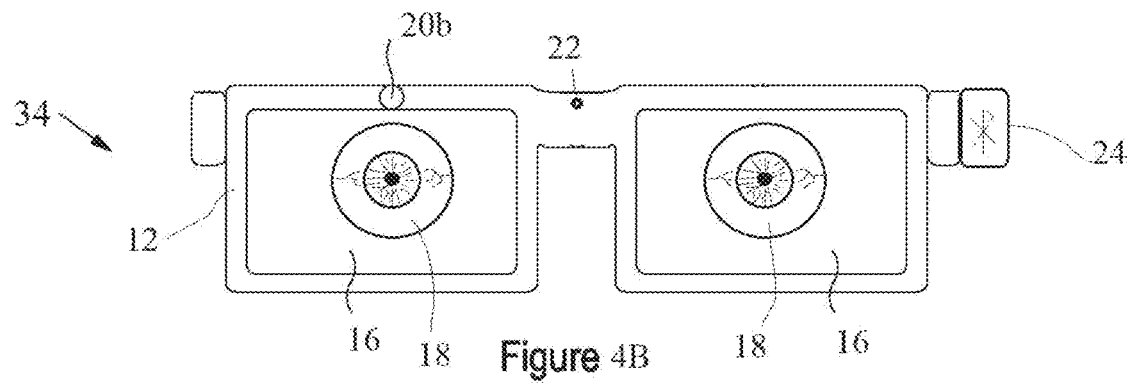
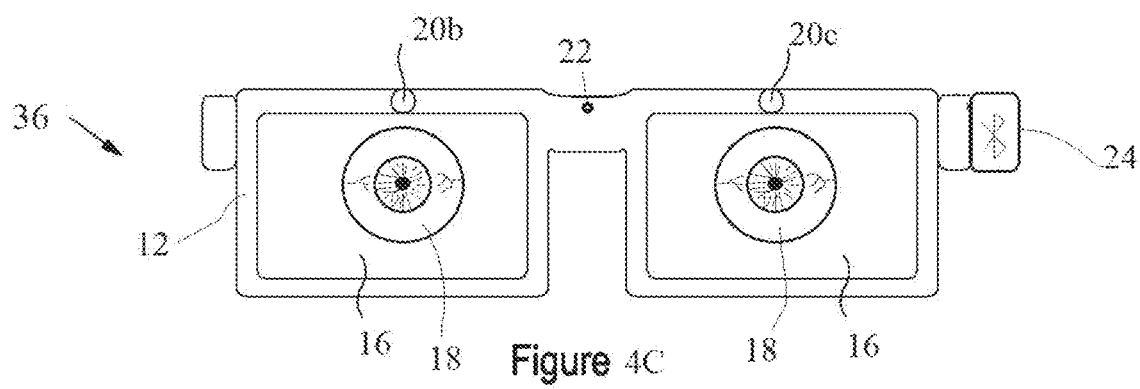
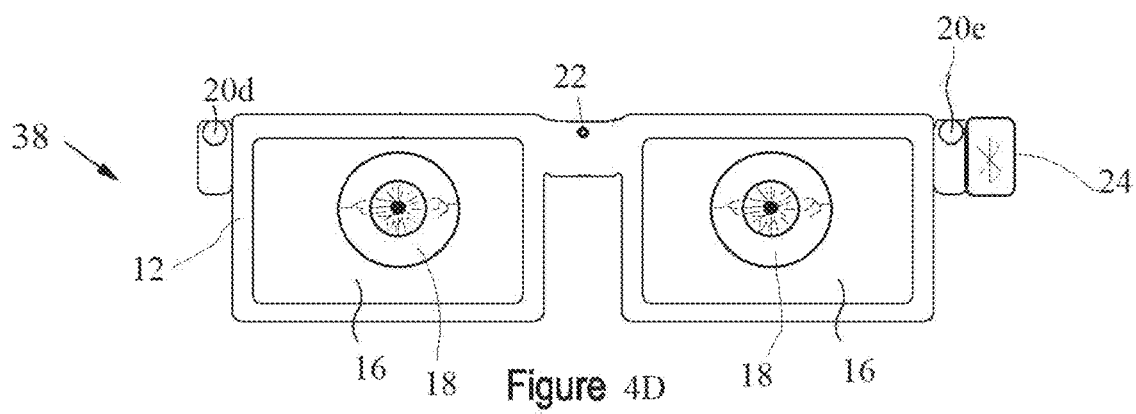
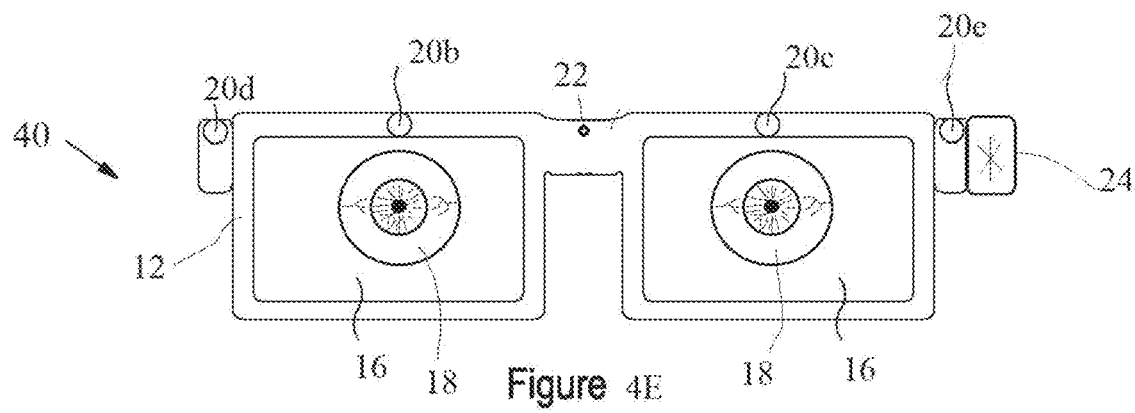

WEARABLE VIRTUAL RETINAL DISPLAY

FIELD AND BACKGROUND OF THE INVENTION

The invention, in some embodiments, relates to the field of user interfaces with computers and more particularly, but not exclusively, to methods and input devices for inputting information such as user-commands to a computer by a person wearing a virtual retinal display device that allows the person to concurrently see the real world.

Computers including desktop computers and laptops as well as portable devices such as smartphones, cellular phones and tablets, require an input device to receive user commands.

One popular input device is the touchscreen that functions as both a display screen and an input device for an associated a computer. For use as an input device, the computer displays a graphical-user interface (GUI) on the touchscreen. The GUI delineates portions of the screen that are input areas and indicates, with text or icons, which command is performed when a specific input area is touched.

A person using a computer looks at the GUI on the touchscreen and touches a specific input area based on which command it is desired to perform.

Touchscreens have some disadvantages.

It would be useful to have an input device and/or method for inputting information such as user-commands to a computer that has at least one advantage over touchscreens.

SUMMARY OF THE INVENTION

The invention, in some embodiments, relates to the field of user-interfaces with computers and more particularly, but not exclusively, to methods and devices for inputting information such as user-commands to a computer by a person wearing a virtual retinal display device that allows the person to concurrently see the real world.

According to an aspect of some embodiments of the teachings herein, there is provided method for inputting information to a computer by a person wearing a virtual retinal display (VRD) device which device allows the person to concurrently see the real world, the method comprising:
  i. with a worn virtual retinal display device comprising a gaze tracker, displaying at least one indicator that indicates the location of at least one virtual input area at a fixed location directly on the retina of a person for an input time window so that the person sees the at least one indicator at a real volume in the person's field of view overlayed over the real world;
  ii. during the input time window, with at least one camera acquiring a series of images of a real volume in front of the person that includes the real volume corresponding to the virtual input area;
  iii. with a computer, processing at least one image of the series of images to identify whether or not the person appropriately manipulated a real volume corresponding to one of the at least one virtual input area; and
  iv. if the image processing 'iii' identifies that the person appropriately manipulated a real volume corresponding to one of the at least one virtual input areas, a computer performs an action associated with the appropriate manipulation of the real volume.

According to an aspect of some embodiments of the teachings herein, there is also provided a wearable virtual retinal display (VRD) device (the device configured to function as an input device for a computer). be worn by a person, comprising:
  a. a frame allowing a person to wear the device on the head;
  b. a VRD module comprising a gaze tracker physically associated with the frame for projecting a visible image directly on a retina of a person (who is wearing the device) and concurrently allowing the person to see the real world;
  c. at least one camera physically associated with the frame, with a lens-front directed at a real volume in front of the person, configured for acquiring a series of images of the real volume in front of the person;
  d. a controller functionally-associated with the virtual retinal display module and the at least one camera, configured for implementing a method according to the teachings herein (as described above, hereinbelow, in the appended claims and in the figures) by receiving images from the at least one camera and by activating the virtual retinal display module to project images directly on a retina of the person; and
  e. a power source physically-associated with the frame to provide power to the virtual retinal display module and to the at least one camera.

According to an aspect of some the embodiments of the teachings herein, there is also provided a wearable virtual retinal display (VRD) device configured to be worn by a person, comprising:
  a. a frame allowing a person to wear the device on the head;
  b. a VRD module comprising a gaze tracker physically associated with the frame for projecting a visible image directly on a retina of the person (who is wearing the device) and concurrently allowing the person to see the real world;
  c. at least one camera physically associated with the frame, with a lens-front directed at a real volume in front of the person, configured for acquiring a series of images of the real volume in front of the person;
  d. a controller functionally-associated with the virtual retinal display module and the at least one camera, configured for implementing a method for inputting information to a computer by receiving images from the at least one camera and by activating the virtual retinal display module to project images directly on a retina of the person; and
  e. a power source physically-associated with the frame to provide power to the virtual retinal display module and to the at least one camera,
  wherein the method for inputting information to a computer comprises:
    i. with the VRD module displaying at least one indicator that indicates the location of at least one virtual input area at a fixed location directly on the retina of the person for an input time window so that the person sees the at least one indicator at a real volume in the person's field of view overlayed over the real world;
    ii. during the input time window, with at least one camera acquiring a series of images of a real volume in front of the person that includes the real volume corresponding to the virtual input area;
    iii. with a computer, processing at least one image of the series of images to identify whether or not the person appropriately manipulated a real volume corresponding to one of the at least one virtual input areas; and iv. if the image processing 'iii' identifies that the person appropriately manipulated a real volume corresponding to one of the at least one virtual input areas, a computer performs an action associated with the appropriate manipulation of the real volume.

In the art, a telephony device is a device that includes a telephony module and an input module. The telephony module includes components (hardware, software and/or firmware) that allow the telephony device to wirelessly communicate with another telephony device through a mobile telephony system (e.g., a cellular telephone network). The input module allows a user of the telephony device to input commands to operate the device. Examples of common telephony devices are cellular telephones and smartphones.

In some embodiments, a wearable VRD device according to the teachings herein is configured to operate as an input module for a telephony device (see, for example, embodiments depicted in FIG. 5), allowing the device to be used to input information to a telephony device.

In some embodiments, a wearable VRD device according to the teachings herein is configured to operate as an input module for a telephony device and is in wireless communication with a telephony module of the device (as depicted, for example, in some embodiments of FIGS. 5A, 5B, 5E and 5F). In some such embodiments, the wearable VRD device and the telephony module are considered separate devices. Alternatively, in some such embodiments, the wearable VRD device and the telephony module are considered components of the same device.

In some embodiments, a wearable VRD device according to the teachings herein is configured to operate as an input module for a telephony device and is in wired communication with a telephony module of the device (as depicted, for example, in some embodiments of FIGS. 5C, 5D and 5G). In some such embodiments, the wearable VRD device and the telephony module are considered separate devices. Alternatively, in some such embodiments, the wearable VRD device and the telephony module are considered components of the same device.

In some embodiments, a wearable VRD device according to the teachings herein is configured to operate as a sole input module for a telephony device (as depicted, for example, in some embodiments of FIGS. 5F and 5G).

In some embodiments, a wearableVRD device comprises a telephony module that is physically associated with the frame of the device (see FIG. 5G).

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.
In the Figures:

FIG. 4B is a schematic depiction of an embodiment of a device according to the teachings herein having a single camera with a single lens-front located above the pupil of the person;

FIG. 4C is a schematic depiction of an embodiment of a device according to the teachings herein having two cameras each having a lens-front located above a different pupil of the person;

FIG. 4D is a schematic depiction of an embodiment of a device according to the teachings herein having two cameras each having a lens-front located lateral to a different eye of the person;

FIG. 4E is a schematic depiction of an embodiment of a device according to the teachings herein having four cameras two having a lens-front located above a different pupil of the person and two having a lens-front located lateral to a different eye of the person;

DESCRIPTION OF SOME EMBODIMENTS OF THE INVENTION

Figure 1:
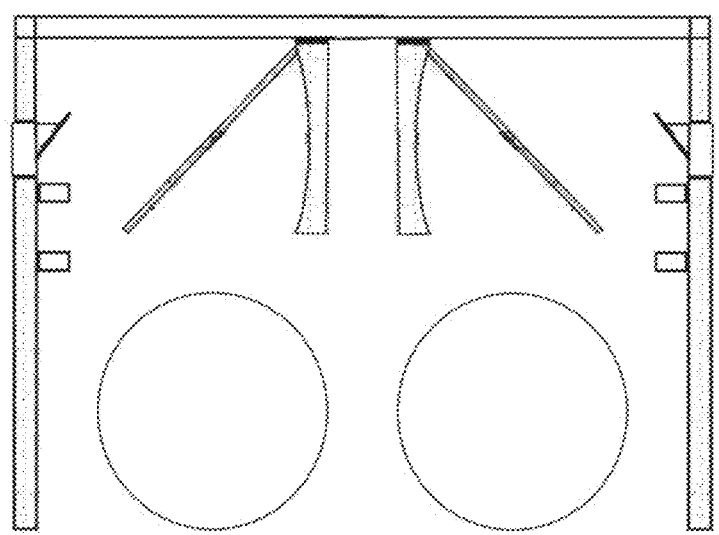
FIG. 1 (prior art) schematically depicts a virtual retinal display device described in US 2021/0307605 from the top.

The invention, in some embodiments, relates to the field of user-interfaces with computers and more particularly, but not exclusively, to methods and input devices for inputting information such as user-commands to a computer by a person wearing a virtual retinal display device that allows the person to concurrently see the real world.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

Method for Inputting Information to a Computer

According to an aspect of some embodiments of the teachings herein, there is provided a method for inputting information to a computer by a person wearing a virtual retinal display device that allows the person to concurrently see the real world, the method comprising:

i. with a worn virtual retinal display device comprising a gaze tracker, displaying at least one indicator that indicates the location of at least one virtual input area at a fixed location directly on the retina of a person for an input time window so that the person sees the at least one indicator at a real volume in the person's field of view overlayed over the real world;

ii. during the input time window, with at least one camera acquiring a series of images (frames) of a real volume in front of the person that includes the real volume corresponding to a virtual input area;

iii. with a computer, processing at least one image of the series of images to identify whether or not the person appropriately manipulated the real volume; and iv. if the image processing 'iii' identifies that the person appropriately manipulated the real volume, a computer performs an action associated with the appropriate manipulation of the corresponding virtual input area.

In some embodiments, the at least one indicator is displayed on only one retina of the person by the VRD device. In some such embodiments, the at least one indicator is displayed on a first retina of the person and a second retina of the person is allowed to see the real world, preferably, without display of information by the retinal display device. An advantage of some such embodiments is that a person can concentrate on images received from the first retina to better see the at least one indicator or, alternatively, to concentrate on images received from the second retina to better see the real world without interference of the at least one indicator.

Alternatively, in some such embodiments the at least one indicator is displayed on a first retina of the person by the VRD device and digital information such as content is displayed (e.g., using the VRD device) on the second retina of the person. An advantage of some such embodiments is that a person can concentrate on images received from the first retina to better see the at least one indicator or, alternatively, to concentrate on images received from the second retina to better see the digital content without interference of the at least one indicator.

Alternatively, in some embodiments the at least one the indicator is displayed on both retinae of the person by the VRD device. When an indicator is displayed on both retinae, in some embodiments the indicator is displayed monoscopically. In some embodiments, when an indicator is displayed on both retinae, the virtual input area is displayed stereoscopically.

A virtual input area is an imaginary area in the field of view of the person wearing the virtual retinal display device. To the person, the virtual input area corresponds to a real volume in the person's field of view which the person can manipulate, for example, by placing their hand therein or by making a specific hand gesture therein. The at least one camera acquires a series of images of the real volume and these images are processed to identify whether or not an appropriate manipulation is performed at the real volume in which case an action associated with the appropriate manipulation of the virtual input area that corresponds to the real volume is performed by a computer. The person's perception is that there is a visible indicator which indicates a real volume in front of the person, and the person perceives manipulating the visible indicator by actually manipulating the corresponding real volume. The image processing of the computer determines the presence or absence of an appropriate manipulation in the real volume and is unaffected by the indicator which is displayed on one or both retinae of the person.

An indicator is a virtual object that is displayed at a fixed location on the retina of the person using a virtual retinal displat device. Even when the person moves their head or eyes, the indicator remains at the same location in the person's field of view. The indicator is any suitable indicator configured to indicate the location of a virtual input area in any suitable way. In some embodiments, an indicator coincides with a corresponding virtual input area, completely or partially, for example, an indicator is a distinct color and/or has a distinct shape that is contained inside, overlaps with or includes the corresponding virtual input area. For example, in some such embodiments, the indicator is a colored region that is smaller, the same size or larger than the virtual input area. Additionally or alternatively, in some such embodiments the indicator is a glyph (a purposeful mark) such as a circle, dot, dash or cross that indicates the location of the virtual input area, for example, being located at or surrounding the center of the virtual input area. Additionally or alternatively, in some such embodiments, the indicator surrounds the virtual input area, e.g., is a partial frame or a complete frame. Additionally or alternatively, in some embodiments the indicator comprises a glyph that is at least partially or even entirely outside of the virtual input area, for example one or more arrows or lines pointing at the location of the virtual input area. Additionally or alternatively, in some embodiments, an indicator comprises an icon or text. In some embodiments, some or all of an indicator is a constant indicator which does not change appearance during the input time window. In some embodiments, some or all of an indicator is a changing indicator which appearance changes during the input time window, e.g., flashes and/or moves such as rotates.

Any given virtual input area is "active", that is to say, susceptible to activation by appropriate manipulation of the corresponding real volume for a time window. Typically, the time window is long, in preferred embodiments not less than 1 second and even not less than 2 seconds.

In preferred embodiments, at least one of the at least one camera, preferably all of the cameras of the at least one cameras, are physically associated with the worn virtual retinal display device.

In some embodiments, at least one camera is physically associated with the virtual retinal display device with a lens-front directed at the real volume in front of the person from above the nose and/or between the eyes of the person.

Additionally or alternatively, in some embodiments at least one camera is physically associated with the virtual retinal display device with a lens-front directed at the real volume in front of the person from above and/or below an eye of the person, preferably above and/or below the pupil of an eye.

Additionally or alternatively, in some embodiments at least two of the cameras are physically associated with the virtual retinal display device each having a lens-front directed at the real volume in front of the person from above or below an eye (and preferably above or below the pupil of an eye) of the person, each lens-front above and/or below a different eye.

Additionally or alternatively, in some embodiments at least two of the cameras are physically associated with the virtual retinal display device each having a lens-front directed at the real volume in front of the person from lateral to an eye of the person, each lens-front lateral to a different eye.

The frame rate of the one or more cameras is any suitable frame rate. In some embodiments, the one or more cameras are configured to acquire the series of images at a frame rate of not less than 30 frames per second and even not less than 45 frames per second. In some embodiments, the one or more cameras are configured to acquire the series of images at a frame rate of not more than 120 frames per second and even not more than 90 frames per second. Selection of a suitable frame rate is described below with reference to the device of the teachings herein.

The one or more cameras comprise any suitable lens (objective) providing any suitable depth of field. In preferred embodiments, the depth of field is such that images acquired of objects at a distance of greater than 25 cm and less than 50 cm from a lens-front are sufficiently focused for image analysis. Additionally, it is even more preferred that images acquired of objects outside of the range are, as much as possible, not in focus. In some embodiments, the lens is a fixed-focus lens and the depth of field is fixed. Selection of a suitable depth of field is described below with reference to the device of the teachings herein.

The one or more cameras comprise any suitable lens providing any suitable field of view. A narrower field of view limits the width of the real volume in front of a person where a real volume that can be manipulated can be located. A broader field of view may increase the amount of data that needs to be processed. A person having ordinary skill in the art is able to determine a suitable field of view for a particular embodiment. That said, it is currently believed that a suitable field of view is between about 70° and about 1000 horizontal and between about 80° and about 100° vertical.

In some embodiments, the at least one virtual input area comprises a single virtual input area.

Alternatively, in some embodiments, the at least one virtual input area comprises at least two virtual input areas, at least four, at least nine, at least 12, at least 16, at least 32 and even at least 40 virtual input areas, each having a different corresponding real volume. In preferred such embodiments, at least some of the at least two virtual input areas are perceived by the person as being arranged in a specific arrangement. In some embodiments, such a specific arrangement is selected from the group consisting of a list; a table, a keyboard pattern and a manual pattern (e.g., piano keyboard). In some such embodiments, a keyboard pattern is selected from the group consisting of a number pad, a 10-key keyboard, a 12-key keyboard and a QWERTY (or equivalent for non-Latin script) keyboard. In some such embodiments, a manual pattern is selected from the group consisting of a 25-key, 37-key, 44-key, 49-key, a 61-key, a 73-key and a 88-key manual.

In some embodiments, the computer for processing the series of images is in wired communication with the worn virtual retinal display device. In typical such embodiments, the computer is physically associated with the virtual retinal display device, for example, the computer is a separate computer for processing the images or the computer is also the controller of the virtual retinal display device. Alternatively, in some embodiments the computer for processing the series of images is in wireless communication with the worn virtual retinal display device, for example, wireless communication via one or more of Bluetooth®, WiFi and telephony (in such embodiments, the computer typically being not physically-associated with the worn virtual retinal display device). In some such embodiments, the processing computer is a component of the device that is physically-separate from the virtual retinal display device. Alternatively, in some such embodiments the processing computer is a computer that is not a component of the device but is used by the device to perform the image analysis required for implementing the method.

In some embodiments, processing images of the series of images to identify whether or not the person appropriately manipulated the real volume comprises at least one member selected from the group consisting of:
identification of a specific visual element in an image; and
identification of a specific motion in at least some images of the series of images.

In some embodiments, the identification of specific visual element or specific motion is of a tool, preferably a specific tool having visual attributes easily identifiable in acquired images. The person is provided with the tool to implement the teachings herein and manipulates the real volume using the tool, in a manner analogous to a stylus used to input data to early-model touchscreen smartphones. Any suitable tool can be used in implementing such embodiments, for example a ring, glove or wand.

In some such embodiments, the tool is a tool that reflects a specific wavelength of light, and the method further comprises illuminating the real volume with light having the specific wavelength, preferably a wavelength invisible to humans (e.g., NIR). For example, in some such embodiments, a ring is provided with a decorative element such as a gem or a wand is painted with a paint, the element or the paint reflective of a particular wavelength of light. In some such embodiments, the cameras are preferably provided with narrowpass filters to filter out substantially all but the particular wavelength of light.

Additionally or alternatively, in some such embodiments, the tool is a tool that fluoresces when illuminated with a specific wavelength of light, and the method further comprises illuminating the real volume with light having the specific wavelength, preferably a wavelength invisible to humans (e.g., NIR). For example, in some such embodiments, a ring is provided with a decorative element such as a gem or a wand is painted with a paint, the element or the paint being fluorescent. In such embodiments, the cameras are preferably provided with narrowpass filters to filter out substantially all but the wavelength of light that corresponds to the fluorescence.

Additionally or alternatively, in some such embodiments, the tool is a light-emitting tool, preferably emitting light invisible to humans (e.g., NIR). For example, in some such embodiments, a ring is provided with a decorative element that comprises a LED (e.g., a NIR LED) or a wand includes one or more different LEDs (e.g., the different LEDs emitting the same or different wavelengths, preferably NIR LEDs). In such embodiments, emitted light is preferably monochromatic. In preferred such embodiments, the cameras are preferably provided with narrowpass filters to filter out substantially all but the wavelength or wavelengths of light that are emitted.

Additionally or alternatively, in some such embodiments, some or all of the tool has a specific shape that is easy to identify using image processing, for example, a star-shape at the end of a wand as known in the art of magical wands.

Although a tool can be useful in some embodiments, in preferred embodiments the identification of specific visual element or specific motion is of a body part, preferably a hand. A hand is typically available to a person. A hand can make many easily-identifiable gestures that can constitute a specific visual element in an image (e.g., a closed hand with one, two or three upraised fingers) and easily-identifiable specific motions (e.g., raising or lowering one or more fingers, rotating in three planes, swiping in any particular direction). For image processing, in some embodiments the identification of a hand in an image can be confirmed by identifying the arm which connects the hand to an edge of the image.

In some embodiments, image acquisition is done with ambient light. A potential disadvantage is that some ambient lighting conditions may be insufficient for providing images that allow robust image analysis. Accordingly, in some embodiments the method further comprises: during the acquiring, illuminating the real volume with light, preferably with light that comes from the direction of the virtual retinal display device, preferably from a light source physically associated with the virtual retinal display device, preferably with light that is invisible to humans. In preferred embodiments, the method further comprises: during the acquiring, illuminating the real volume with light having a specific wavelength, wherein the identification is of an object in the real volume that reflects the specific wavelength. In some preferred embodiments, the illumination is from a light source that emits monochromatic light having the specific wavelength. In preferred such embodiments, the cameras are provided with narrowpass filters to filter out substantially all but the specific wavelength of light. In such embodiments, the intensity of the light used for illuminating is preferably relatively low so that nearby objects (e.g., from about 20 cm up to about 70 cm from the virtual retinal display device), such as a hand used to perform a manipulation, reflect the light sufficiently to be easily discernable in an image from further objects and the background.

In some embodiments, processing of the images of the series of images to identify whether or not the person appropriately manipulated the real volume further comprises determining at least one distance to a physical object located in the real volume.

In some such embodiments, the at least one distance is determined by an apparent size of the physical object. For example, in embodiments where the physical object is a tool such as a wand or the hand of a preregistered user having a well-defined correlation of pixel-size in an acquired image to distance from the lens-front: the distance from the lens-front is easily determined by evaluating the size of the physical object in the image. Additionally or alternatively, in some embodiments the at least one camera is at least two cameras and the at least one distance is determined by calculating parallax in images acquired by the at least two cameras.

In some embodiments, processing the images of the series of images to identify whether or not the person appropriately manipulated the real volume comprises determining one distance to a physical object located in the real volume. For example, in some such embodiments an appropriate manipulation includes positioning a hand about 30 cm from the virtual retinal display device.

In some embodiments, processing the images of the series of images to identify whether or not the person appropriately manipulated the real volume comprises determining two distances to a physical object located in the real volume at two different times to determine a motion of the physical object. For example, in some such embodiments an appropriate manipulation includes moving a hand perpendicular to the camera plane, in a pushing or pulling motion. For example, in some such embodiments an appropriate manipulation includes moving a hand parallel to the camera plane, in a swiping motion.

In some embodiments, a motion to be determined corresponds to a motion selected from the group consisting of: touching a virtual input area; swiping a virtual input area; rotating a virtual input area, pushing a virtual input area, pulling a virtual input area and a combination thereof.

In some embodiments, after identification that the person appropriately manipulated the real volume in 'iii', the action performed by the computer comprises:

changing the appearance of the at least one indicator that indicates the location of a specific one virtual input area and then acquiring a further series of images during a second input time window, which further series of images are processed by a computer to identify whether or not the person appropriately manipulated the real volume a second time, and if the image processing identifies that the person appropriately manipulated the real volume a second time, a computer performs an action associated with the second appropriate manipulation of the virtual input area.

In some embodiments, the method further comprises detecting a facial gesture and, if a detected facial gesture corresponds to a prestored command, performing the command. Detecting a facial gesture can be performed in any suitable way, typically using a camera facing the user, for example, a camera that is a component of the gaze tracker of the worn VRD device. In some embodiments, the gesture is an eyelid gesture such as a gesture comprising at least one wink (one lowered eyelid), at least one blink (two lowered eyelids) and combinations thereof. For example, in some embodiments a specific facial gesture or series of facial gestures leads to presentation of a different set of at least one indicators (analogous to presenting a different menu on a computer).

For example, in some embodiments, a specific facial gesture or series of facial gestures is used to enter a specific command selected by appropriate manipulation of a real volume corresponding to a virtual input area. Accordingly, in some embodiments, after identification that the person appropriately manipulated the real volume in 'iii', the action performed by the computer comprises:

during a time window detecting a facial gesture of the person; and if a detected facial gesture corresponds to a prestored command, performing the command.

For example, first the person virtually touches a virtual key by manipulating the real volume corresponding to the key which prepares the computer to perform a specific activity on receipt of the appropriate facial gesture and, optionally, also changes the appearance of the key. If and when the appropriate facial gesture is detected, the computer actually performs the command indicated by the virtual key.

The method can be performed using any suitable device or suitable combination of devices including a virtual retinal device comprising a gaze tracker. A virtual retinal display (VRD), also known as a retinal scan display (RSD) or retinal projector (RP), is a display device configured to draw, with light (especially laser light), an image to be displayed directly onto a retina of an eye of a person, e.g., in some embodiments analogous to a raster display. The person sees what appears to be a conventional display floating in space despite the fact that the image as a whole never exists on the retina at any moment.

Perceived image quality improves with a higher repetiton rate. Although 30 Hz is generally sufficient, in some embodiments a repetition rate of at least 40 Hz, at least 50 Hz and even at least 60 Hz is preferred.

Typically, the drawing on the retina is with a narrow beam of light such as from a laser or multiple lasers. Some VRD devices are monochrome, e.g., using a single visible laser to draw on the retina. Some VRD devices are color, e.g., using multiple visible lasers of different wavelengths to draw on the retina, for example a red, green and blue laser. Low-power lasers are preferably used to avoid damaging the retina, in some embodiments a laser used in implementing VRD has an output power of not more than about 100 microwatts, not more than about 50 microwatts and even not more than about 25 microwatts.

There exist VRD devices that do not include a gaze tracker, but in preferred embodiments the teachings herein are implemented using a VRD device comprising a gaze tracker. A gaze tracker is a component of a VRD device that is used to track the optical axis of the eye allowing a specific image to be drawn at the same location of the retina even when the eye moves.

A particularly preferred VRD device for use in implementing the teachings herein is the VRD device described in US 2021/0307605 by the Inventor, an embodiment of which is schematically depicted from above in FIG. 1 from above. One advantage among the advantages provided by such a device is retinal registration. Specifically, at any moment, an image is drawn on the retina by the VRD device relative to an identified characteristic feature of the retina. As a result, an image is repeatedly redrawn at the same location on the retina with unprecedented accuracy providing a clear and sharp image even when drawn with a light source having a relatively low light intensity, e.g., having an output power of not more than about 100 microwatts, not more than about 50 microwatts and even not more than about 25 microwatts.

In preferred embodiments, the method according to the teachings herein is performed using a device according to the teachings herein which, in some preferred embodiments, uses a virtual retinal display device such as the virtual retinal display device of US 2021/0307605 as a virtual retinal display module. In preferred embodiments the light sources (e.g., lasers) used by the virtual retinal display module have an output power of not more than about 100 microwatts, not more than about 50 microwatts and even not more than about 25 microwatts. Some details and embodiments of the method will be discussed hereinbelow with reference to an embodiment of the device according to the teachings herein.

The accuracy that is provided by a virtual retinal display device comprising a gaze tracker to repeatedly display a given image at the same location on the retina allows the teachings herein to be used to display very small virtual input areas. This is especially true for virtual retinal display devices that use retinal registration, for example as described in US 2021/0307605. Accordingly, in some embodiments the dimensions of at least one virtual input area is not more than 20° in the x-direction and not more than 20° in the y-direction, where x is the horizontal dimension and y is the vertical dimension of the visual field. In some embodiments, at least 25%, at least 33%, at least 50% and evenat least 80% of the virtual input areas displayed at any one time are of such dimensions. Typically, the dimensions of such a virtual input area or of such virtual input areas are not less than 0.1° in the x-direction and not less than 0.1° in the y-direction. In some such embodiments the dimensions of such a virtual input area or of such virtual input areas are not more than 15°, not more than 8°, not more than 5°, not more than 4°, not more than 30, not more than 2° and even not more than 1° in the x-direction. Additionally or alternatively, in some such embodiments the dimensions of such a virtual input area or of such virtual input areas is not more than 15°, not more than 8°, not more than 5°, not more than 4°, not more than 3°, not more than 2° and even not more than 1° in the y-direction.

The accuracy that is provided by a virtual retinal display device comprising a gaze tracker to repeatedly display a given image at the same location on the retina additionally allows the teachings herein to be used to display multiple virtual input areas at any one time, especially close-together virtual input areas, in any desired pattern such as a list, keyboard pattern, table pattern and a manual pattern. This is especially true for virtual retinal display devices that use retinal registration, for example as described in US 2021/0307605. Accordingly, (additionally or alternatively to the dimensions recited above) in some embodiments, the at least one virtual input area is at least two, at least four, at least nine, at least 12, at least 16, at least 32, and even at least 40 virtual input areas that are displayed at the same time. In some embodiments, (additionally or alternatively to the dimensions and the number of virtual input areas recited above) at least two neighboring virtual input areas (and in some embodiments, at least four, at least nine, at least 12, at least 16, at least 32 and even at least 40 neighboring virtual input areas) are separated by not more than 8°, not more than 5°, not more than 4°, not more than 3°, not more than 2° and even not more than 1°.

Device According to the Teachings Herein

According to an aspect of some embodiments of the teachings herein, there is also provided a wearable virtual retinal display device configured to be worn by a person, comprising:

a. a frame allowing a person to wear the device on the head;
b. a virtual retinal display module comprising a gaze tracker physically associated with the frame for projecting a visible image directly on a retina of the person and concurrently allowing the person to see the real world;
c. at least one camera physically associated with the frame, with a lens-front directed at a real volume in front of the person, configured for acquiring a series of images of the real volume in front of the person;
d. a controller functionally-associated with the virtual retinal display module and the at least one camera, configured for implementing at least one embodiment of the method according to the teachings herein by receiving images from the at least one camera and by activating the virtual retinal display module to project images directly on a retina of the person; and
e. a power source physically-associated with the frame to provide power to the virtual retinal display module and to the at least one camera.

The wearable virtual retinal display device according to the teachings herein is configured to serve as an input device for a computer, for example, a computer that is a component of the device or a computer external to the device such as a laptop computer, desktop computer, tablet and smartphone.

In some embodiments, the device is configured to detect a facial gesture made by a person wearing the device. In some such embodiments, the facial gesture is at least one facial gesture selected from the group consisting of a wink and a blink. In some embodiments, the configuration comprises including a camera having a lens-front configured to acquire an image of at least a portion of the face of a person wearing the device and providing the acquired image to the controller to perform image analysis to detect a facial gesture. In some embodiments, the configuration comprises software and/or hardware modification of the gaze tracker of the virtual retinal display module and of the controller.

Figure 2A:
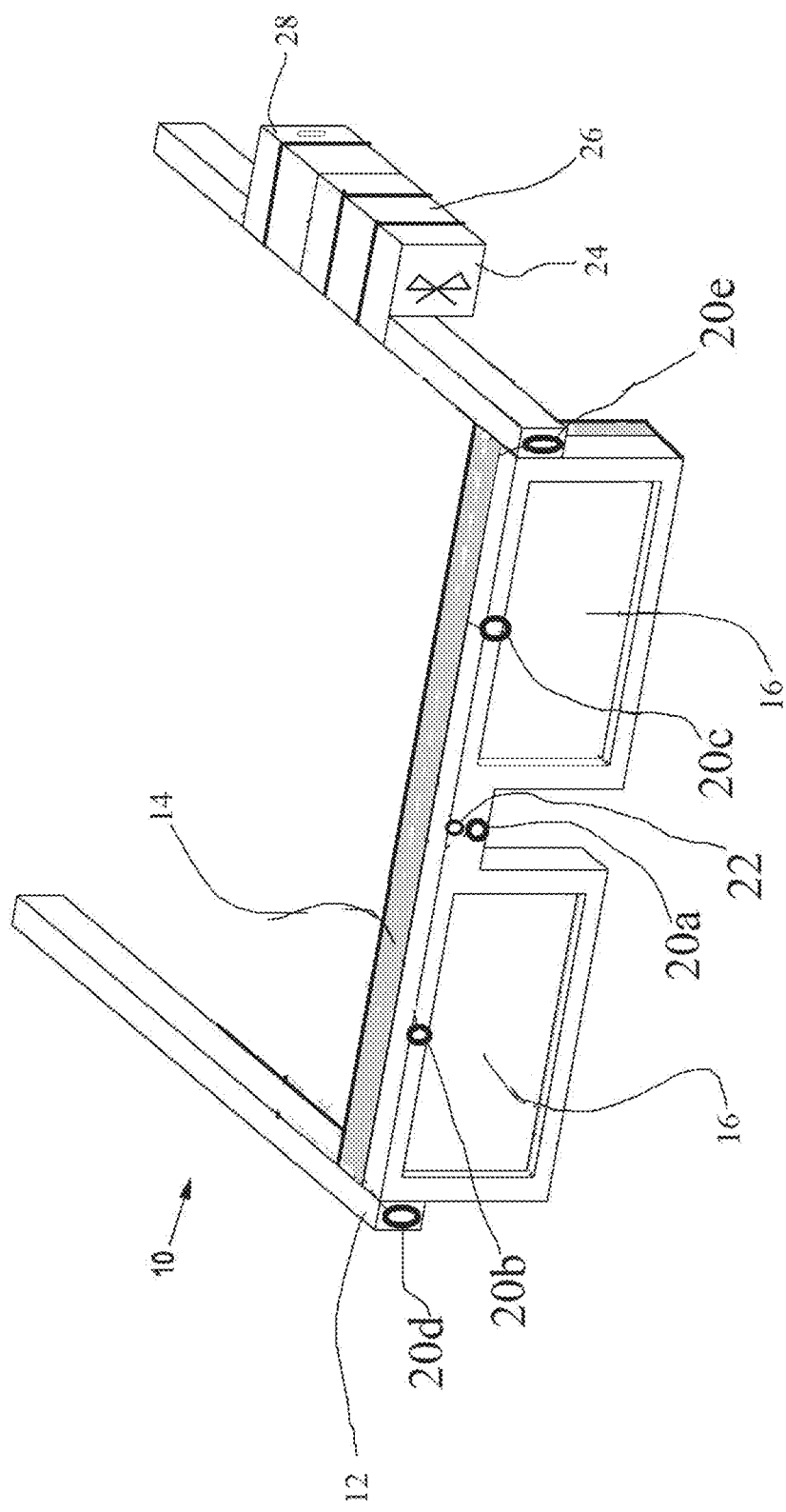
FIGS. 2A and 2B are schematic depictions of an exemplary embodiment of a binocular device according to the teachings herein.
Figure 2B:
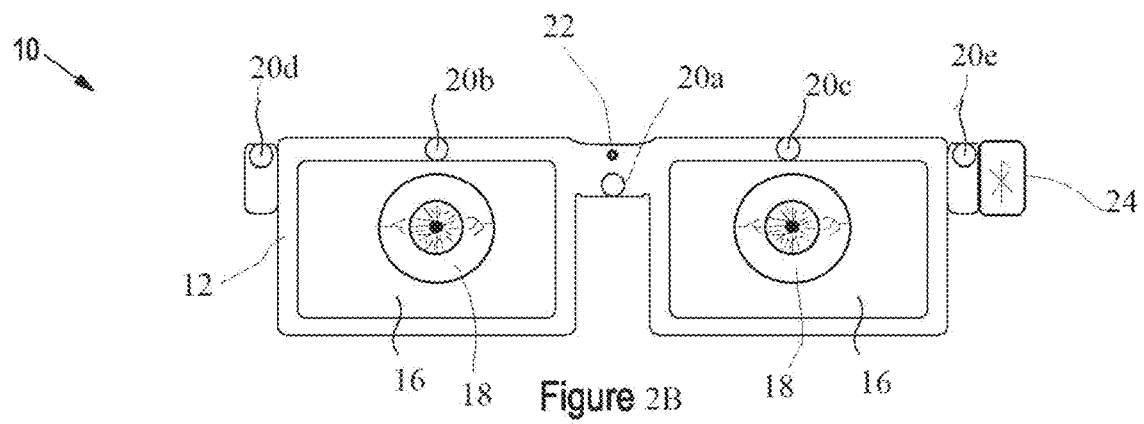

An embodiment of such a device, device 10 is depicted in FIG. 2A (perspective view from the top front) and FIG. 2B (view from the front). Device 10 includes a frame 12 that allows a human to wear device 10 on the head and a virtual retinal display module 14 that is physically associated with frame 12 for projecting a visible image directly on both retinae of a person and concurrently allowing the person to see the real world through transparent screens 16. The position of the eyes of a person of device 12 are indicated by eyes 18 in FIG. 2B. Virtual retinal display module 14 is similar in components and operation to virtual retinal display devices known in the art, for example, the virtual retinal display device described in US 2021/0307605 which is included by reference as if fully set-forth herein to provide support for the virtual retinal display module.

Device 10 includes five cameras physically associated with frame 12, similar to cameras known in the art of smartphones, e.g., such as a found on Galaxy S21 Ultra by Samsung Electronics (Suwon-si, South Korea). Each one of the five cameras has a lens-front 20$a$, 20$b$, 20$c$, 20$d$ and 20$e$ directed at a real volume in front of a person, each camera configured for acquiring a series of images of the real volume in front of a person through a respective lens-front 20.

Device 10 further includes a light source 22 comprising a light-emitting diode configured, when activated, to project light into the real volume in front of the person to illuminate objects in the real volume, thereby allowing the cameras to acquire higher-quality images of such objects. Specifically, in device 10 light source 22 comprises a NIR LED that illuminates objects with light that is invisible to humans but is detectable by the cameras.

Device 10 further includes a wireless-communication module 24, comprising a class 4 Bluetooth® transceiver emitting a maximum of 0.5 mW and having a maximal range of ~50 cm.

Device 10 further includes a controller 26, a computer processor with required peripheral hardware, e.g., similar to the processor and peripherals found on Galaxy S21 Ultra by Samsung, functionally-associated through wired communication with virtual retinal display module 14, the five cameras, light source 22. and wireless-communication module 24. Controller 26 is hardware and/or software and/or firmware configured to control the operation of virtual retinal display module 14, the five cameras, light source 22 and wireless communication module 24 including being configured to implement one or more embodiments of the method according to the teachings herein by receiving images from the cameras and by activating virtual retinal display module 14 to project images directly on both retinae of a person.

Device 10 further includes a power source 28, a rechargeable battery such as known in the art of smartphones that is physically-associated with frame 12, power source 28 configured to provide power to virtual retinal display module 14, the five cameras, light source 22, wireless-communication module 24 and controller 26.

Monocular Device

In some embodiments such as device depicted in FIGS. 1, the virtual retinal display module is configured for projecting a visible image on both retinae of a person. In some alternative embodiments, the virtual retinal display module is configured for projecting a visible image on only one retina of a person. Such an embodiment is depicted in FIG.

3, a device 30 from the front. Device 30 is substantially similar to device 10 depicted in FIG. 2. A substantial difference is that device 30 is a monocular device, that is to say, the virtual retinal display module (not depicted) of device 30 is configured to project a visible image directly on only one retina of a person (the left retina) and concurrently allowing the person to see the real world with both eyes.

Figure 3:
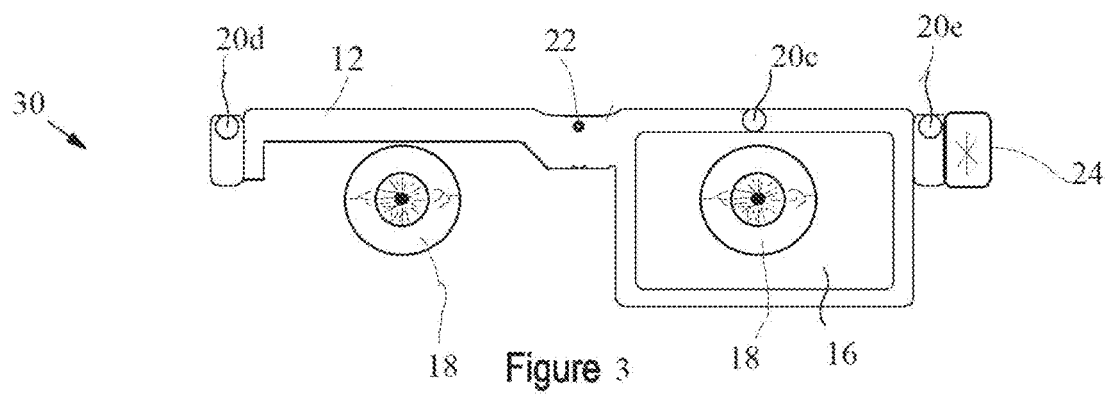
FIG. 3 is a schematic depiction of an embodiment of a monocular device according to the teachings herein.

As noted in the discussion of the method according to the teachings herein, embodiments where indicators indicating one or more virtual input areas are only displayed to one eye while leaving the second eye free can be advantageous. For instance, a person can see the real world by concentrating on the image received from the second eye (in FIG. 3, the right eye) without interference or obstruction caused by implementation of the teachings herein. When desired to use the teachings, the person can concentrate on the image received from the first eye (in FIG. 3, the left eye).

Cameras

A device according to the teachings herein may have any suitable number of cameras that are physically associated with the frame, each camera having a lens-front directed at a real volume in front of a person, configured for acquiring a series of images of the real volume in front of a person.

Any suitable digital camera may be used for implementing the teachings herein, for example, cameras as known in the art of smartphones.

The one or more cameras are configured to acquire the series of images at any suitable frame rate. In some embodiments, the one or more cameras are configured to acquire the series of images at a frame rate of not less than 30 frames per second and even not less than 45 frames per second, allowing identification of quick human gestures. In some embodiments, the one or more cameras are configured to acquire the series of images at a frame rate of not more than 120 frames per second and even not more than 90 frames per second in order to limit the amount of unneccesary data acquired.

The one or more cameras comprise any suitable lens (objective) providing any suitable depth of field. In preferred embodiments, the depth of field is such that images acquired of objects at a distance of greater than 25 cm and less than 50 cm from a lens-front are sufficiently focused for image analysis. Additionally, in some embodiments it is preferred that images acquired of objects outside of the range are, as much as possible, not in focus. In some embodiments, the lens is a fixed-focus lens and the depth of field is fixed.

The one or more cameras comprise any suitable lens providing any suitable field of view. A narrower field of view limits the width of the real volume in front of a person where a real volume that can be manipulated is found. A broader field of view may increase the amount of data that needs to be processed. A person having ordinary skill in the art is able to determine a field of view suitable for a particular embodiment. That said, it is currently believed that a suitable field of view for typical embodiments is between about 70° and about 100° horizontal and between about 80° and about 100° vertical.

The camera or cameras of the at least one camera is/are mounted on the frame with a lens-front located at any suitable location.

In some embodiments a camera is mounted on the frame with a lens-front located above the nose of a person, such as lens-front 20a of device 10.

In some embodiments, a camera is mounted on the frame with a lens-front located above or below an eye, preferably above or below the pupil of the eye, of a person, such as lens-fronts 20b and 20c of device 10. Such embodiments allow the camera to acquire images that are close to what the eye sees.

In some embodiments, the device comprises at least two cameras mounted on the frame with a lens-front above and/or below an eye of a person (preferably above the pupil of the eye), each lens-front above and/or below a different eye such as lens-fronts 20b and 20c in device 10. Such embodiments allow each camera to acquire images that are close to what a respective eye, allows two images each acquired by a different one of the two cameras to be used as input by a processor to calculate a distance to an object, and also allows more details of an object to be acquired, making it easier to determine whether or not a person is appropriately manipulating a real volume.

In some embodiments, at least one camera is mounted on the frame with a lens-front located lateral to an eye of a person (such as lens-front 20d or 20e in device 10) and more preferably, at least two cameras are mounted on the frame with a lens-front lateral to an eye of a person, each lens-front lateral to a different eye such as lens-fronts 20d and 20e in device 10. Such embodiments allow more details of an object to be acquired, making it easier to determine whether or not a person is appropriately manipulating a real volume and, in the two-camera embodiments, allows two images each acquired by a different one of the two cameras to be used as input by a processor to calculate a distance to an object with a greater distance resolution due to the increased distance between the lens-fronts.

In FIGS. 4A, 4B, 4C, 4D and 4E are depicted additional embodiments of a device according to the teachings herein from the front. The devices are all substantially similar to device 10 depicted in FIGS. 2A and 2B but include a different number of cameras and respective lens-fronts 20.

Figure 4A:
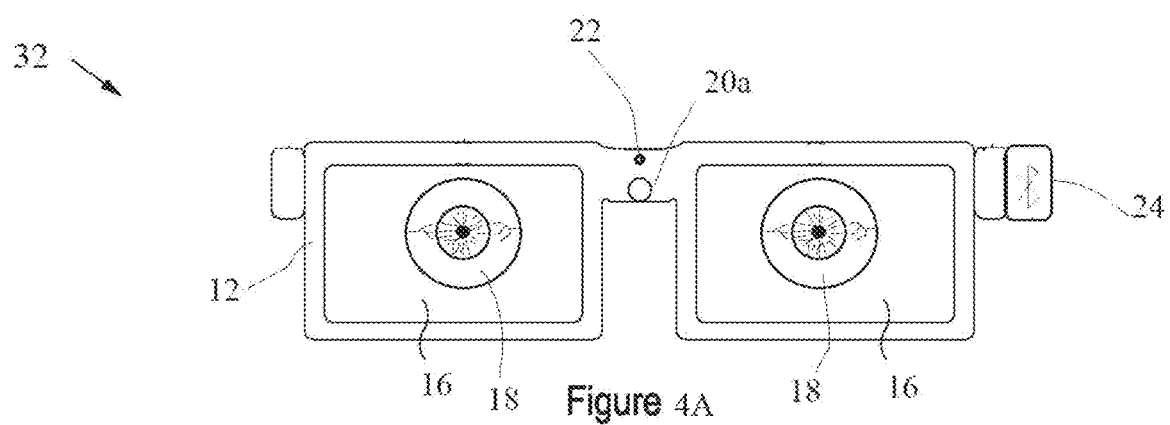
FIG. 4A is a schematic depiction of an embodiment of a device according to the teachings herein having a single camera with a single lens-front located above the nose of a person wearing the device (a wearer)

In FIG. 4A, a device 32 includes only a single camera with a single lens-front 20a located above the nose of a person.

In FIG. 4B, a device 34 includes only a single camera with a single lens-front 20b located above the pupil of the right eye of a person onto which retina the virtual retinal display module is configured to project a visible image.

In FIG. 4C, a device 36 includes two cameras each with a lens-front 20b and 20c located above or below the eye of a person, lens-front 20b above the pupil of the right eye and lens-front 20c above the pupil of the left eye of a person.

In FIG. 4D, a device 38 includes two cameras each with a lens-front 20d and 20e located lateral to an eye of a person, lens-front 20d lateral to the right eye and lens-front 20e lateral to the left eye of a person.

In FIG. 4E, a device 40 includes four cameras, two with a lens-front 20b and 20c above a different pupil of a person and two with a lens-front 20d and 20e lateral to a different eye of a person.

Light Source

In some embodiments, a device further comprises a light source physically associated with the frame and configured, under control of the controller, to project light into the real volume in order to illuminate objects located in the real volume with the projected light. Preferably, such illumination allows the at least one camera to acquire images of sufficient quality for image processing under different ambient light conditions.

Any suitable light source may be used. In preferred embodiments, the light source comprises one or more LEDs as these produce relatively intense light and have relatively modest power requirements.

The light source has any suitable beam width. As the primary purpose of the light source is to illuminate objects located in the real volume, in some embodiments the beam width is similar or identical to the field of view of the cameras. In some embodiments, the beam width is between 70° and 100°.

The intensity of light from the light source is any suitable intensity. As the primary purpose of the light source is to illuminate objects located in the real volume, in some embodiments the intensity of light is such that objects up to a distance of about 50 cm from the lens-front or fronts are sufficiently illuminated and preferably, that further objects are not well-illuminated. A person having ordinary skill in the art is able to determine a suitable intensity upon perusal of the description herein.

The light source is configured to project any suitable wavelength or combination of wavelengths of light. In some embodiments, the light source projects white light.

In some embodiments, the light source is configured to project exclusively invisible (to humans) light that can be detected by the at least one camera, e.g., near-infrared light for example from near-infrared LED. Such embodiments allow illumination by the light source without disturbing the person and other people in the vicinity of the device. In preferred such embodiments, the at least one camera comprises a filter, preferably a narrow pass filter, that allows the light projected by the light source to be detected by the at least one camera while preventing other light from being detected by the camera. Such embodiments reduce the amount of noise in the acquired images, making image processing simpler, faster and more accurate.

In some embodiments, the light source is configured to project exclusively monochromatic light. In preferred such embodiments, the at least one camera comprises a filter, preferably a narrow pass filter, that allows the light projected by the light source to be detected by the at least one camera while preventing other light from being detected by the camera. Such embodiments reduce the amount of noise in the acquired images, making image processing simpler, faster and more accurate.

Controller

In FIGS. 5A-5G are depicted additional embodiments of a device according to the teachings herein. The depicted devices are all substantially similar to the previously-discussed embodiments with some differences.

Figure 5A:
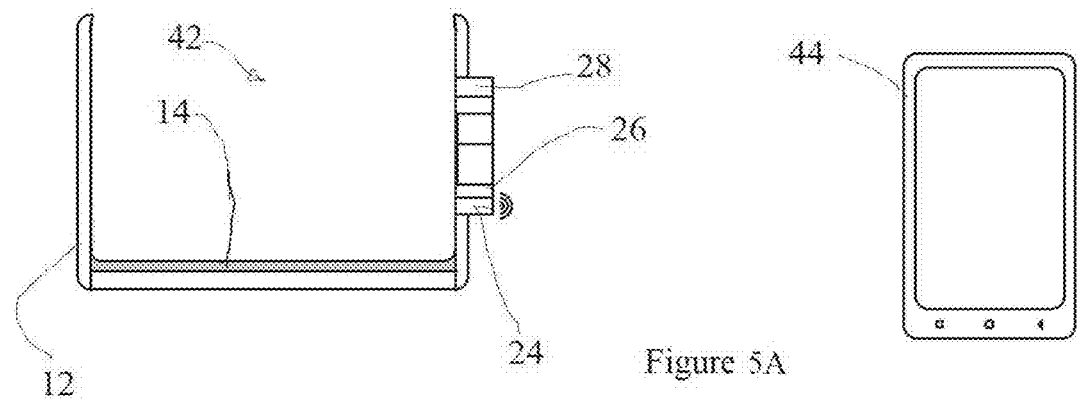
FIG. 5A is a schematic depiction of a embodiment of a device according to the teachings herein having a wireless-communication module allowing the device to function as an input device for smartphone.

In FIG. 5A is depicted a device 42 in top view (similar or substantially identical to any one of the previously described devices) that includes a wireless-communication module 24, comprising a class 4 Bluetooth® transceiver emitting a maximum of 0.5 mW and having a maximal range of ~50 cm. A controller 26 of device 42 is further configured to use wireless-communication module 24 for two-way communication with any suitable device such as a smartphone 44, allowing device 42 to function as an input device for smartphone 44 as an alternate to the smartphone touchscreen.

In some embodiments, such as the previously-described devices, the controller is physically-associated with the frame, and is preferably in wired communication with the virtual retinal display module and the at least one camera, as in the previously-described devices. In some alternate embodiments, at least a portion of the controller is not physically associated with the frame and is in wireless communication with other components of the device.

Figure 5B:
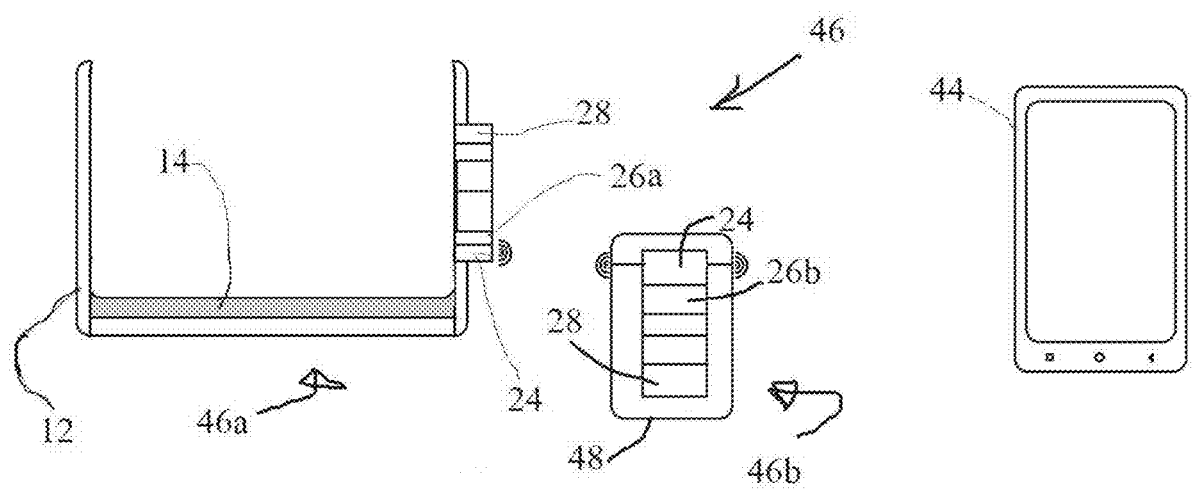
FIG. 5B is a schematic depiction of a embodiment of a device according to the teachings herein comprising two separate physical modules in mutual wireless-communication.

Such an embodiment is depicted in FIG. 5B, a device 46 (except for the differences listed below, similar or substantially identical to any one of the previously described devices) that includes two physically separate assemblies: frame assembly 46a and controller assembly 46b.

Frame assembly 46a includes a virtual retinal display module 14, at least one camera, a wireless-communication module 24 in wired communication with a first sub-controller 26a, all physically associated with a frame 12.

Controller assembly 46b includes a wireless-communication module 24 (a class 4 Bluetooth® transceiver) in wired communication with a second sub-controller 26b (including a computer processor and required peripherals as known in the art of smartphones), all physically associated with and contained in a casing 48 that includes an on-board power source 28 (rechargeable battery) for providing power to the other components.

First sub-controller 26a and second sub-controller 26b are in mutual wireless communication through the respective wireless-communication modules 24 and together constitute the controller of device 46, each doing some of the functions required to perform a specific embodiment of the method according to the teachings herein. For example, in some embodiments, first controller module 26a performs some controller functions such as receiving images from the at least one camera and activates virtual retinal display module 14 to project images directly on a retina of a person, while second controller module 26b performs functions such as image analysis and communication with a remote device such as a smartphone 44.

In device 46 depicted in FIG. 5B, second sub-controller 26b is contained in casing 48 and is in wireless communication with a remote device such as smartphone 44. In some similar, non-depicted, embodiments, a second sub-controller module such as 26b is in wired communication with a different device (such as a smartphone 44), for example, through a USB cable that connects through a USB port in casing 48 and a USB port in the remote device.

Figure 5C:
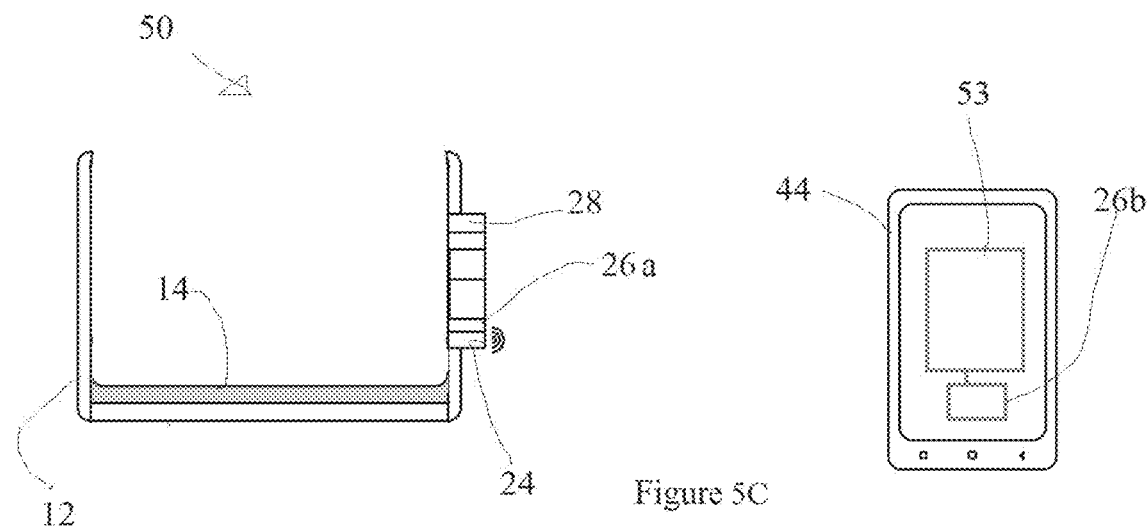
FIG. 5C is a schematic depiction of a embodiment of a device according to the teachings herein comprising two separate physical modules in mutual wireless-communication, a first physical module comprising a virtual retinal display module and a first sub-controller and a second sub-controller being a hardware component of a smartphone.
Figure 5D:
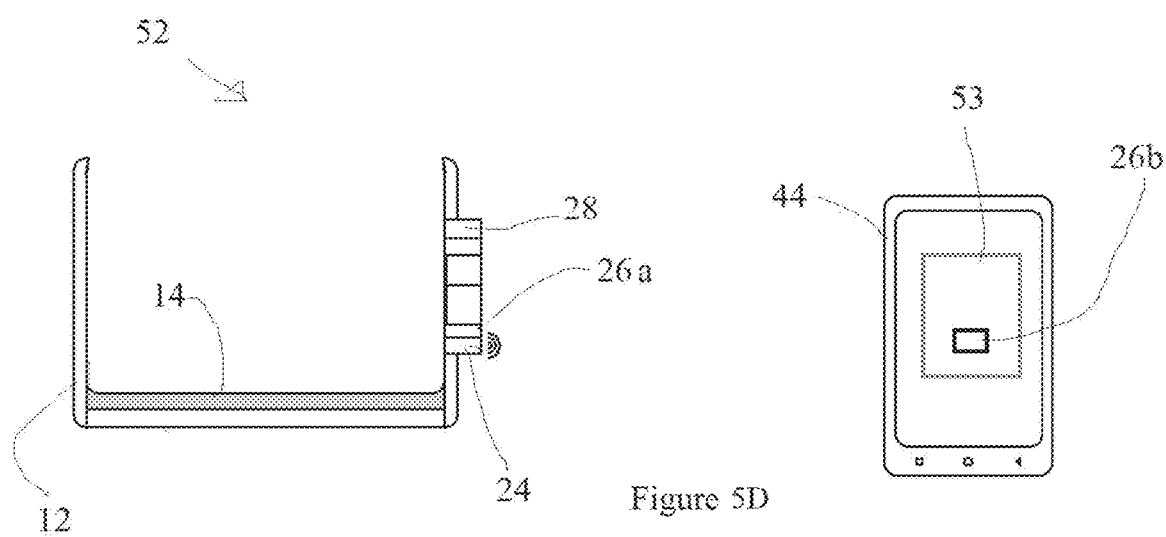
FIG. 5D is a schematic depiction of a embodiment of a device according to the teachings herein comprising two separate modules in mutual wireless-communication, a first physical module comprising a virtual retinal display module and a first sub-controller and a second sub-controller being a software component of a smartphone.

In FIGS. 5C and 5D are depicted devices 50 and 52 respectively, both substantially similar to device 46 depicted in FIG. 5B. However, instead of a controller assembly 46b which comprises a second sub-controller 26b inside a casing 48, a second sub-controller 26b is a component of a remote device such as a smartphone 44. In device 50 depicted in FIG. 4C, a second sub-controller 26b is a separate physical component (e.g., a separate computer processor) of the remote device, smartphone 44, dedicated to implementing the teachings herein. Second sub-controller 26b is in wired communications with a native computer processor 53 of smartphone 44. In device 52 depicted in FIG. 4D, a second sub-controller 26b is software running on a native processor 53 of smartphone 44.

Figure 5E:
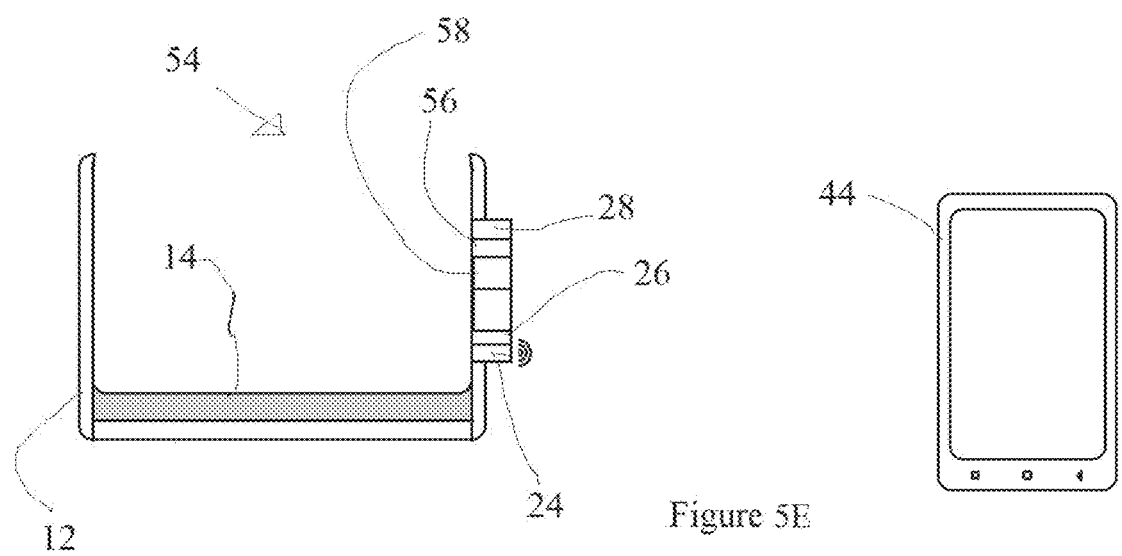
FIG. 5E is a schematic depiction of a embodiment of a device according to the teachings herein comprising a speaker and microphone.

In FIG. 5E is depicted a device 54, substantially similar to device 42 with a number of differences. A first difference is that physically-associated with frame 12 and in wired-communication with controller 26 are a speaker 56 and a microphone 58. Controller 26 and an associated smartphone 44 are configured to allow a person wearing frame 12 to use speaker 56 as an audio output device for smartphone 44, especially for telephone conversations, and to use microphone 58 as an audio input device for smartphone 44, especially for telephone conversations. In such embodiments, smartphone can remain stored (for example, in a bag or pocket) and a user uses the device to control the smartphone, including having telephone conversations. In some similar embodiments, a device 54 is devoid of a speaker 56 and, instead, a user uses standard earphones functionally-associated with the smartphone such as bud-earphones to hear audio output.

Figure 5F:
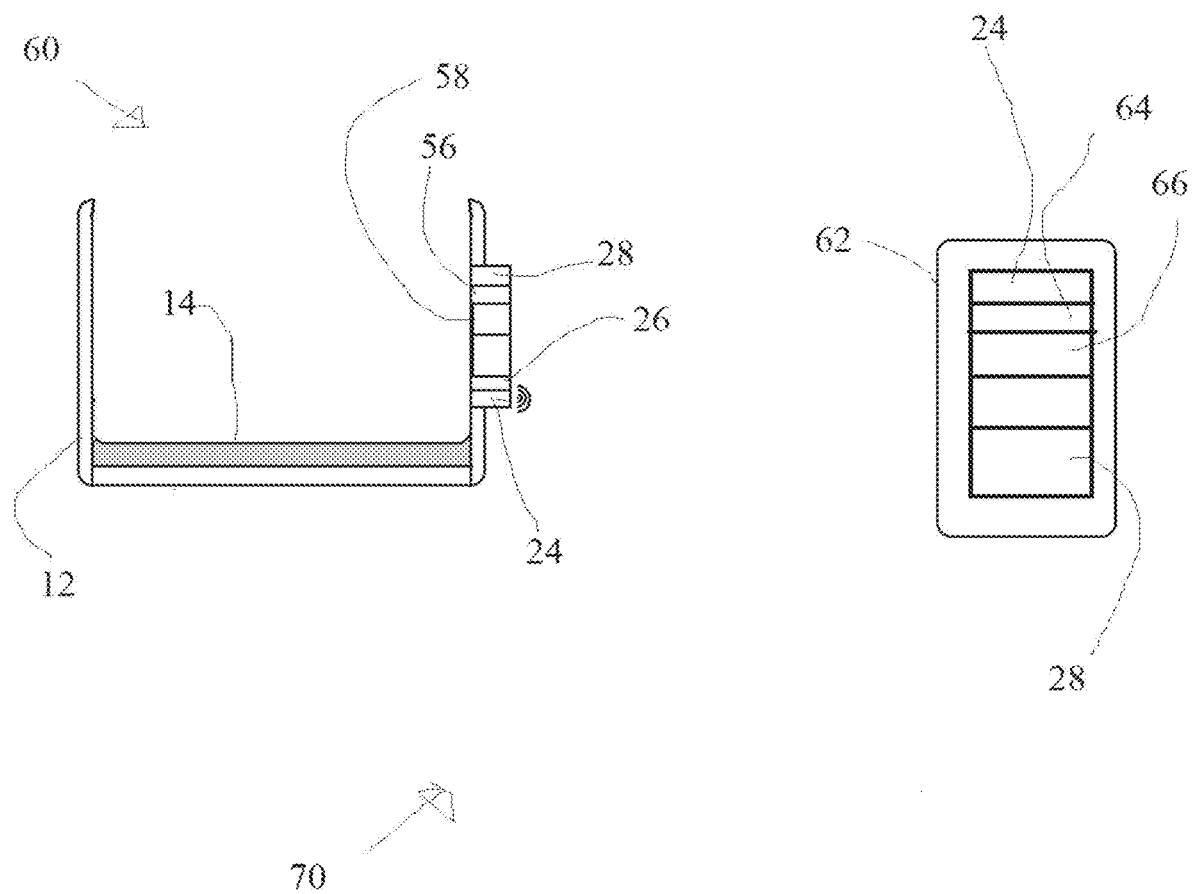
FIG. 5F is a schematic depiction of a embodiment of a device according to the teachings herein in wireless communication with a smartphone that is devoid of a display screen, in some embodiments the device and the display screen together constituting a single device according to the teachings herein.

In FIG. 5F is depicted a device 60 in wireless communication with a modified smartphone 62. Device 60 is similar or identical to any of the devices recited above that are configured to perform as an input/output device for a smartphone. Unlike smartphones known in the art, smartphone 62 is devoid of a display screen as an input/output device but retains other components including a telephony module 64, a smartphone processor 66, a Bluetooth® transceiver 24 and a power source 28. In such embodiments, the smartphone devoid of a display screen such as 62 is configured for accepting input, displaying output information, and for performing telephonic conversations from a device according to the teachings herein such as device 60. As known in the art of smartphones, in some such embodiments, a screenless smartphone such as 62 includes additional components such as required for determining location (e.g., GPS chip) and for WiFi communication. In some such embodiments, a screenless smartphone such as 62 is a component of a smartphone 70 that comprises two physically separate units:

- a screenless smartphone such as 62 comprising a telephony module 64; and
- an input/output device that is a device according to the teachings herein such as device 60 that is in wireless communication with the screenless smartphone (62) and is configured to function as the user input/output interface device of the screenless smartphone.

Figure 5G:
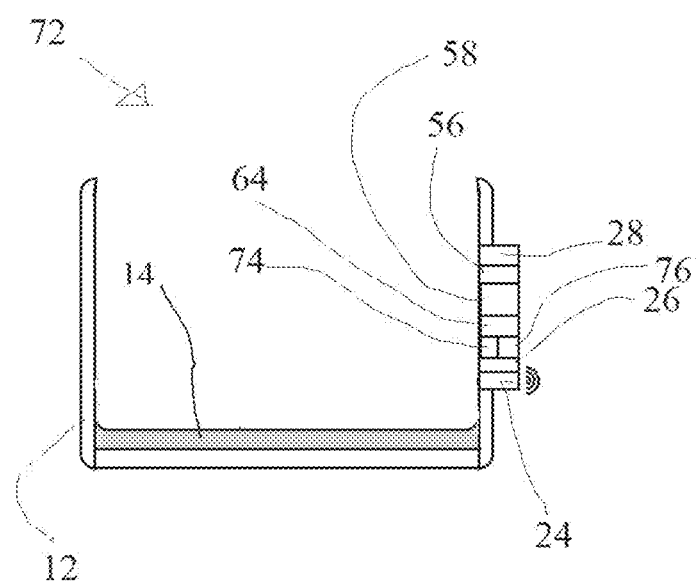
FIG. 5G is a schematic depiction of a embodiment of a device according to the teachings herein configured as a wearable smartphone.

In FIG. 5G is depicted a device 72, device 72 configured to implement the teachings herein and also includes components that allow device 72 to function as a wearable smartphone that is preferably devoid of a touchscreen. Specifically, physically-associated with a frame 12 are a speaker 56, a microphone 58, a telephony module 64, satellite location module 74 (e.g., a GPS chip) and a WiFi communication module 76. A controller 26 is configured to implement the teachings herein as well as to control the other components of the device to function as a smartphone. In some such embodiments, such a device is devoid of one or more of the components, e.g., devoid of a satellite location module and/or devoid of a WiFi communication module and/or devoid of a speaker (and is instead configured to provide audio output to a user through bud-earphones or the like in the usual way (e.g., Bluetooth® communication). A person having ordinary skill in the art of smartphones is able to implement such an embodiment without undue experimentation upon perusal of the description herein.

An advantage of the devices according to the teachings herein, in particular telephony devices such as screenless smartphones (for example, 60 in FIG. 5F and 72 in FIG. 5G) and input devices for smartphones (for example, 42 in FIG. 5A, 46 in FIG. 5B, 50 in FIG. 5C, 52 in FIG. 5D and 54 in FIG. 5E) is that due to the particularly-low energy requirements of the input device according to the teachings herein, the devices can practically implement alternatives to existing smartphones in a compact package with a relatively small battery) by replacing (completely or partially) the energy-hungry touchscreen with a device of the teachings herein.

A device according to the teachings herein, such as any suitable one of the specific embodiments discussed hereinabove, is configured to implement one or more embodiments of the method according to the teachings herein.

Figure 6A:
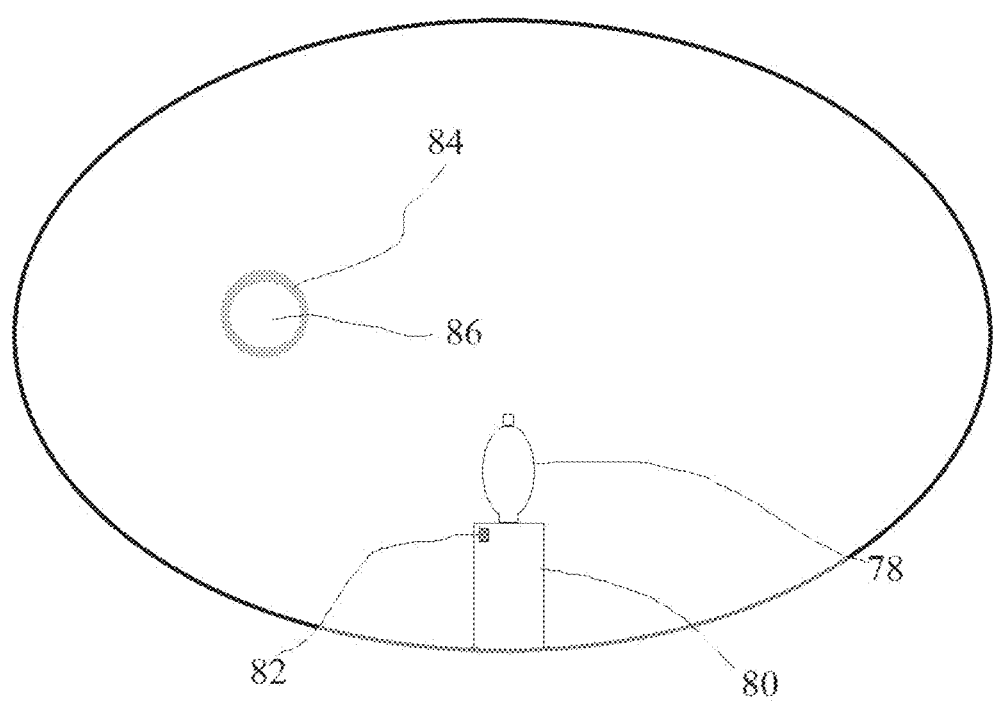
FIG. 6A depicts the field of view of a person wearing an embodiment of a device according to the teachings herein, configured to operate as museum-guide glasses.

In FIG. 6A is depicted the field of view of a person wearing an embodiment of the virtual retinal display device according to the teachings herein, configured to operate as museum-guide glasses. The device is worn by a person wandering around in a location such as a museum. The person approaches a display and is presented, through the device, with one or more options for audiovisual information about the display in accordance with the teachings herein. The person selects the desired option in accordance with the teachings herein and is subsequently provided with the information corresponding to the selected option.

In FIG. 6A, a vase 78 on a pedestal 80 with a QR code 82 is seen. Vase 78, pedestal 80 and QR code 82 are real world objects that the person directly sees through a transparent screen 16 of the worn device. Grey circle 84 is a virtual object that is displayed by virtual retinal display module 14 directly on one retina or both retinae of the person, depending on the embodiment. The inside of grey circle 84 is a virtual input area 86, being the only virtual input area present in FIG. 6A. Grey circle 84 is an indicator that indicates to the person where virtual input area 86 is located, being a distinct complete frame surrounding virtual input area 86 having a distinct color. Virtual input area 86 is at a fixed location at the left of a person's field of view: whatever the person looks at and however the person moves their head and/or eyes, grey circle 84 does not appear to move and always indicates the location of virtual input area 86.

Grey circle 84 appears to be overlayed over the real world: any real world object that is located along the line of sight to grey circle 84 is at least partially blocked from view. In preferred embodiments, a displayed virtual input area such as grey circle 84 is displayed as faintly and inobtrusively as possible yet to be clearly visible. In preferred embodiments, the image characteristics of one, some or all displayed virtual input area are user-adjustable allowing a user to select a desired balance between visibility and inobtrusiveness.

The person knows that appropriate manipulation of the real volume that corresponds to virtual input area 86 activates the museum guide option of the device. Specifically, as long as grey circle 84 is displayed as depicted in FIG. 6A, the input time window for manipulating the real volume corresponding to virtual input area 86 is open: the camera or cameras of the worn device continuously acquire a series of images of the field of view and provide the acquired images to controller 26.

Figure 6B:
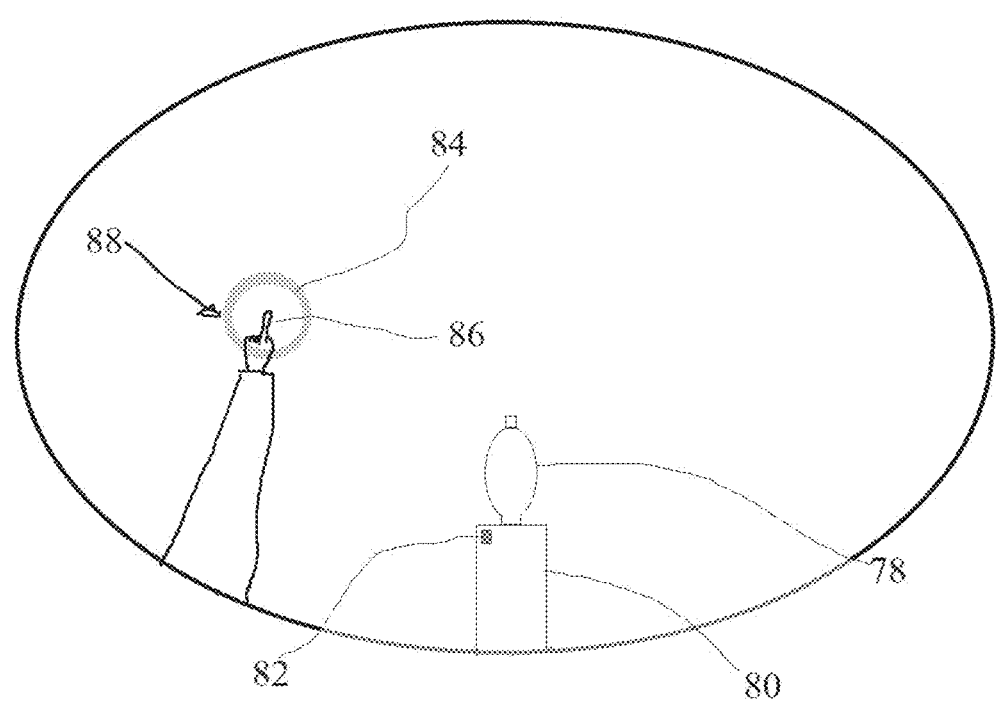
FIG. 6B depicts the field of view of a person wearing an embodiment of a device according to the teachings herein, configured to operate as museum-guide glasses, the person manipulating a real volume corresponding to a virtual input area with a hand.

In FIG. 6B, the person extends the left hand, closed with a single extended finger, into the real volume in front of the person so that the person sees the real hand through screen 16 inside virtual input area 86 indicated by grey circle 84. In FIG. 6B is seen that a portion of the hand is partially obscured by grey circle 84.

Controller 26 uses standard image-analysis techniques to determine whether or not the real volume corresponding to virtual input area 86 is being properly manipulated. Specifically, in FIG. 6B, controller 26 identifies the outline of a closed hand with a single finger at an angle of 90°±20° 88 as appropriate manipulation of the real volume corresponding to virtual input area 86. Any other manipulation is considered as improper manipulation, for example, a clenched fist, a closed hand with two extended fingers, a closed with a single extended finger at 500 or a closed hand with a single extended finger not in the real volume corresponding to virtual input area 86.

In embodiments having range-determination capability (e.g., having at least two cameras and being configured to use a stereoscopic pair of images acquired by the at least two cameras to determine a range), the range to the manipulation can also be a factor in determining whether or not appropriate manipulation is identified. In FIG. 6B, such an embodiment can be implemented to define proper manipulation only when the range to a closed hand with single extended finger is not too far (e.g., no further than when the person extends their arm completely, approximately up to about 50 cm) and not too close (e.g., when the person holds the hand close to transparent screen 16, approximately not less than about 20 cm.

Additionally or alternatively, in some embodiments the size of a manipulation in an image is evaluated to determine whether or not an appropriate manipulation is identified. For example, in FIG. 6B, such an embodiment can be implemented to define proper manipulation only when the single extended finger of a closed hand with single extended finger is defined by more than a minimal number of pixels and fewer than a maximal number of pixels.

Figure 6C:
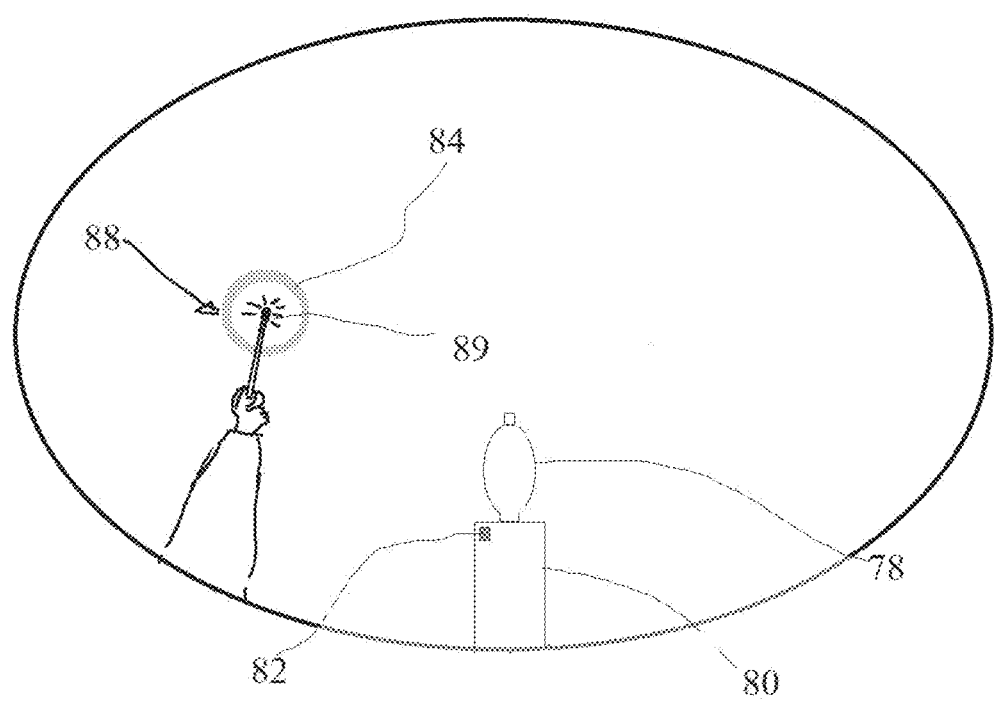
FIG. 6C depicts the field of view of a person wearing an embodiment of a device according to the teachings herein, configured to operate as museum-guide glasses, the person manipulating a real volume corresponding to a virtual input area with a tool.

FIG. 6C is analogous to FIG. 6C, where the person manipulates a real volume using a tool 89 (a NIR LED tipped wand) instead of a hand.

Additionally or alternatively, in some embodiments the motion of a manipulation perpendicular to the image plane is evaluated to determine whether or not an appropriate manipulation is identified. For example, such an embodiment can be implemented by defining proper manipulation only when the single extended finger of a closed hand with single extended finger is moved away from the device, optionally at a velocity that falls within a designated velocity. A person having ordinary skill in the art is able to configure a computer such as controller of a device according to the teachings herein to determine the amount of perpendicular motion and velocity thereof using well-known image processing techniques, including subroutines found in standard image-processing software libraries. For example, the amount of perpendicular motion can be determined by comparing a stereoscopically-determined range to an identified manipulation in two or more different stereoscopic image pairs, the different image pairs acquired at different times, where the velocity can be calculated by dividing the range difference by the acquisition time difference. Additionally or alternatively, the amount of perpendicular motion can be determined by comparing a size of an identified manipulation in two or more different images, where increasing size is considered motion approaching the device and decreasing size is considered motion away from the device, where the velocity can be calculated by dividing the range difference by the acquisition time difference.

Figure 6D:
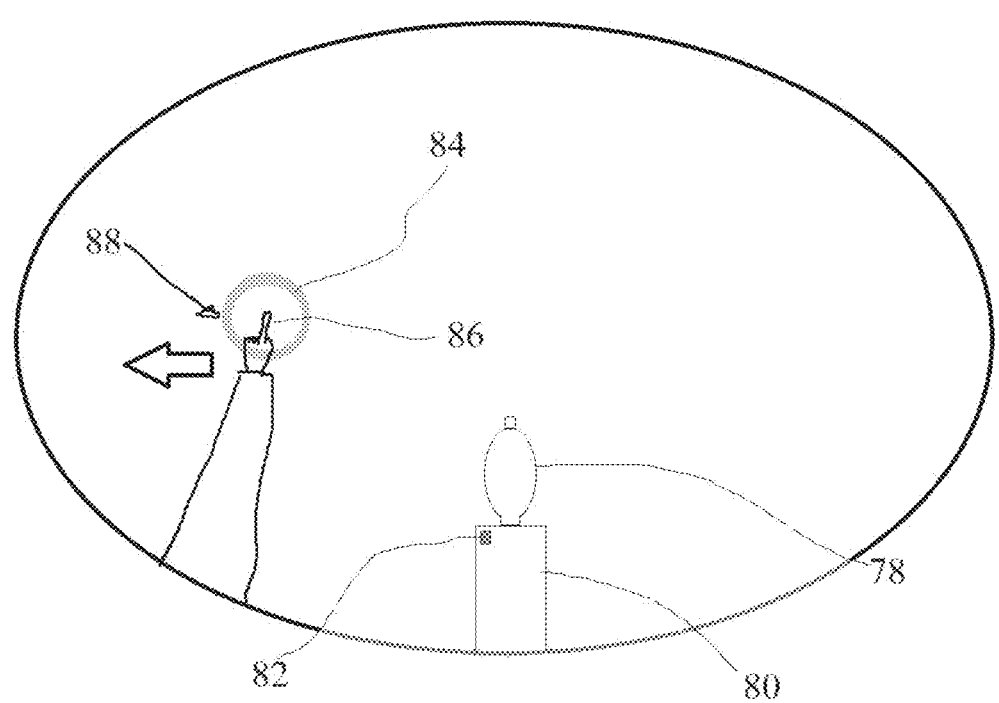
FIG. 6D depicts the field of view of a person wearing an embodiment of a device according to the teachings herein, configured to operate as museum-guide glasses, the person manipulating a real volume corresponding to a virtual input area by swiping with a hand.

Additionally or alternatively, in some embodiments the in-plane motion of a manipulation in a plane parallel to the image plane is evaluated to determine whether or not an appropriate manipulation is identified. For example, in FIG. 6D, such an embodiment is implemented by defining proper manipulation only when the single extended finger of a closed hand with single extended finger is moved to the left (analogous to a "swipe left" motion known in the art of touchscreens), optionally at a velocity that falls within a designated velocity. A person having ordinary skill in the art is able to configure a computer such as controller of a device according to the teachings herein to determining the amount of in-plane motion and velocity thereof using well-known image processing techniques, including subroutines found in standard image-processing software libraries. For example, two different images from an series of images acquired at two different times can be compared to determine in-plane motion and, optionally, velocity thereof.

Figure 6E:
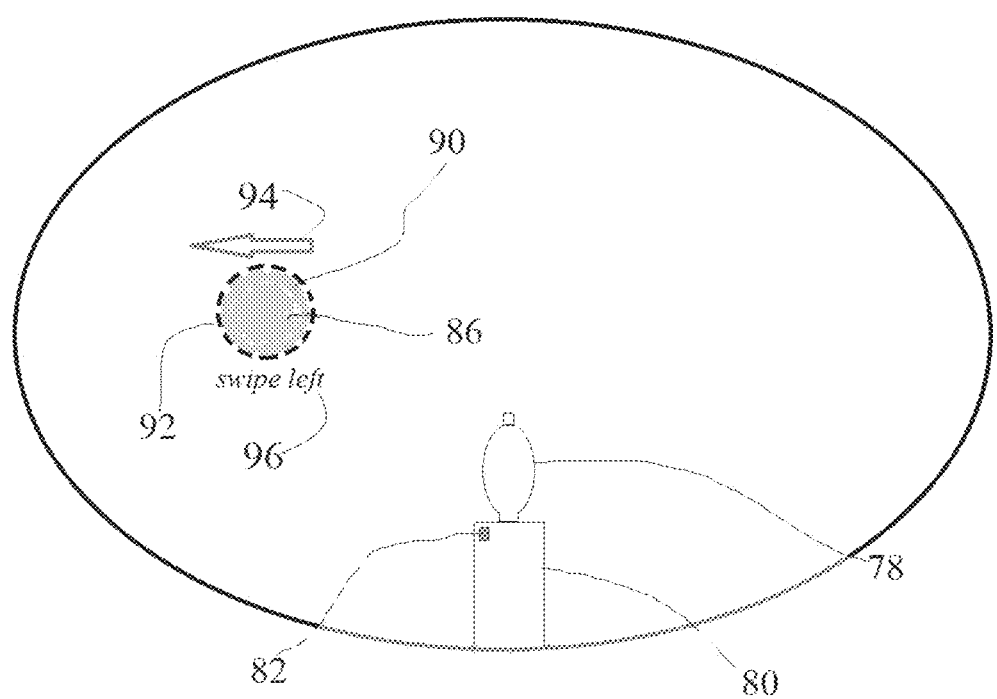
FIG. 6E depicts the field of view of a person wearing an embodiment of a device according to the teachings herein, wherein a single virtual input area has multiple indicators.

In the embodiments above, virtual input area 86 is indicated with a single indicator, grey circle 84. In some alternate embodiments, a given virtual input area has multiple different indicators. FIG. 6E, depicts the field of view of a person wearing an embodiment of a device according to the teachings herein wherein virtual input area 86 has four different indicators:

indicator 90, the entirety of virtual input area 86 being distinctly colored in grey, indicator 92, a partial frame surrounding virtual input area 86;

indicator 94, a glyph (an arrow) that indicate "swiping"; and indicator 96, text.

Figure 6F:
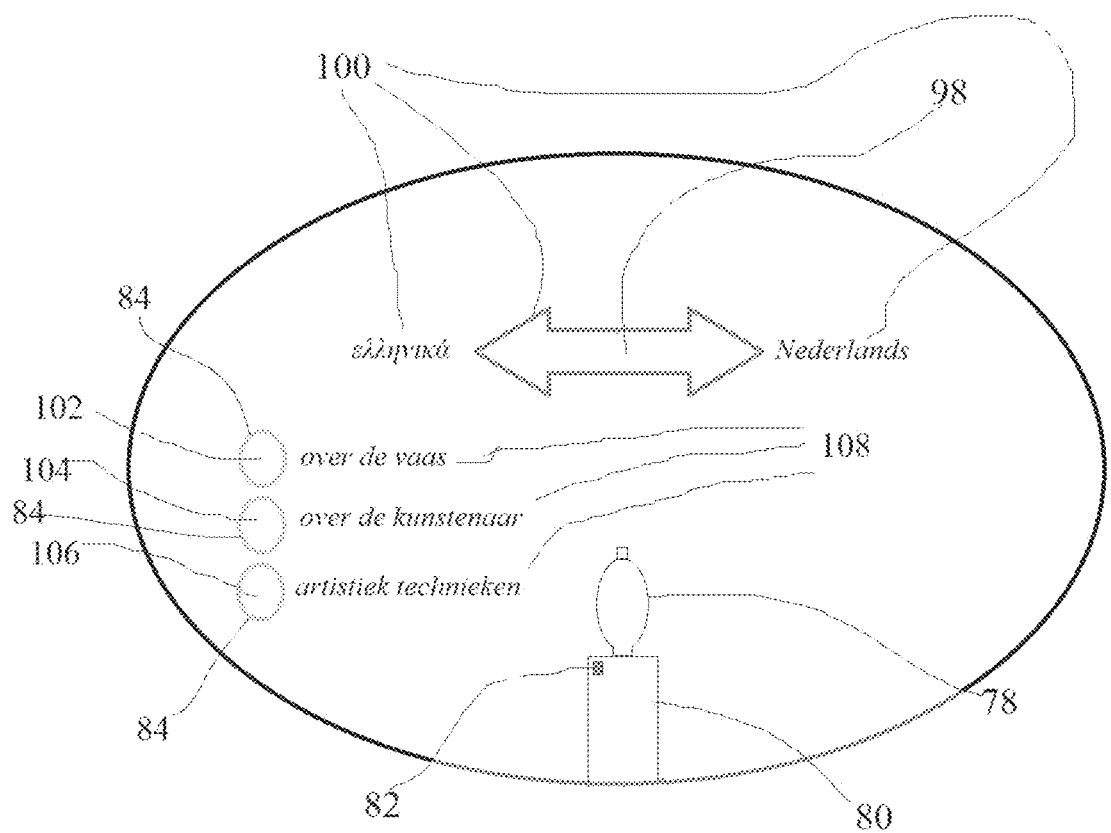
FIG. 6F depicts the field of view of a person wearing an embodiment of a device according to the teachings herein, configured to operate as museum-guide glasses having four different virtual input areas.

Once the image processing performed by controller 26 identifies that the person appropriately manipulated the real volumein front of the person that corresponds to virtual input area 86, optionally the real volume also havinga specified distance from the person, controller 26 performs an action associated with the appropriate manipulation of virtual input area 86 which in the discussed embodiment comprises automatically identifying QR code 82 by receiving images acquired by the device cameras, using standard image-processing techniques identifying QR code 82 and, with reference to information stored in controller 26 or by wirelessly querying a different computer (e.g., the museum computer that stores information about the QR code) displays a following menu presenting options related to the identified QR code as depicted in FIG. 6F.

In FIG. 6F, is depicted the field of view of a person including four different virtual input areas, each one of the four virtual input areas indicated with a corresponding indicator. Like grey circle 84 in FIGS. 6A-6D and indicators 90, 92, 94 and 96 in FIG. 6E, the indicators depicted in FIG. 6F are all virtual objects that are displayed by virtual retinal display module 14 at a fixed location on one or both retinae of the person.

Virtual input area 98 indicated with indicators 100 (the double headed arrow, the two texts) functions as a language toggle associated with two appropriate manipulations: "swipe left" corresponding to Greek and "swipe right" corresponding to Dutch.

Virtual input areas 102, 104 and 106 each have a single associated appropriate manipulation which is known to the person using the device as being identical to the discussed for virtual input area 86 (closed hand with single upraised finger). The indicators for virtual input areas 102, 104 and 106 are the corresponding grey circles 84 and texts 108.

For use, the person appropriately manipulates the real volume corresponding to one of the virtual input areas 102, 104 or 106 with reference to the corresponding indicators to select an audio or audiovisual presentation that the person finds interesting. The person is provided with an audio presentation in the usual way (either through a speaker 56 that is part of the device, or with another audio device such as earphones. The person is also provided with a visual presentation (e.g., arrows indicating features on the vase, text listing important dates) by virtual retinal display module 14. If the person wants to change the language of the audio presentation (from Greek to Dutch, or from Dutch to Greek), the person appropriately manipulates the real volume corresponding to virtual input area 98 with reference to the corresponding indicators 100.

In some preferred embodiments, the teachings herein are implemented to input information to a telephony device such as a smartphone. In some embodiments, a device according to the teachings herein is configured for use as an input device for a telephony device, such as a smartphone or similar device. In some embodiments, a device according to the teachings herein is a component of a telephony device, such as a smartphone or similar device. In some embodiments, a device according to the teachings herein is a telephony device, such as a smartphone or similar device.

Figure 7A:
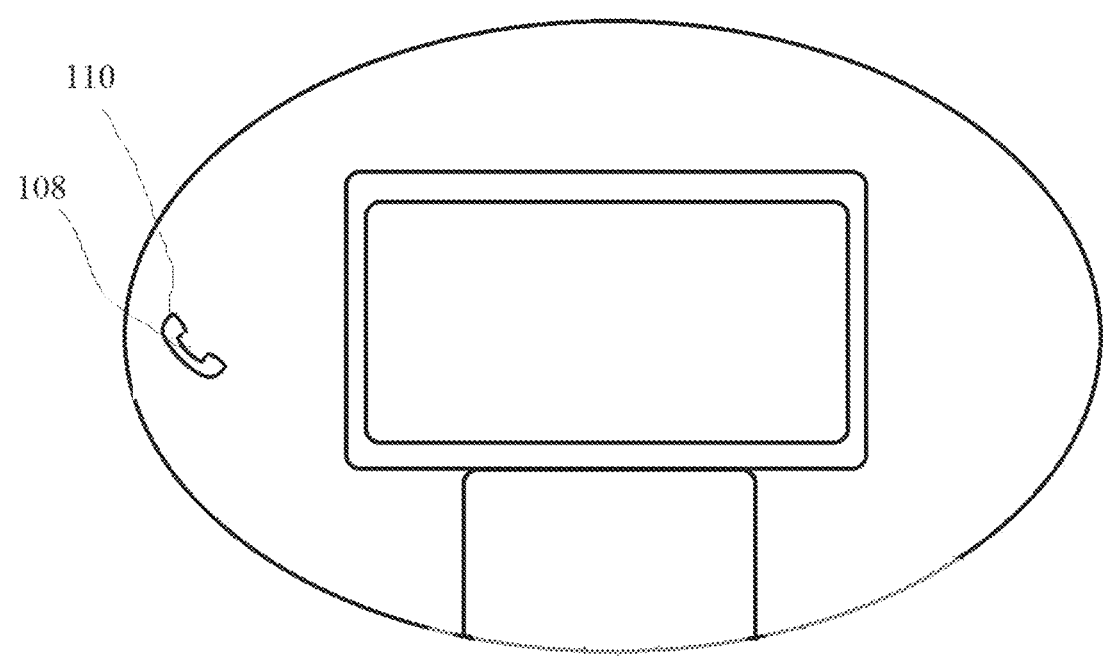
FIG. 7A depicts the first display in the field of view of a person using an embodiment of the teachings herein for telephony.

In FIG. 7A, is depicted the first display in the field of view of a person using an embodiment of the teachings herein for telephony, the person looking at a real computer display screen. There is a single virtual input area 108 indicated by an indicator 110, an icon of a telephone handpiece.

Figure 7B:
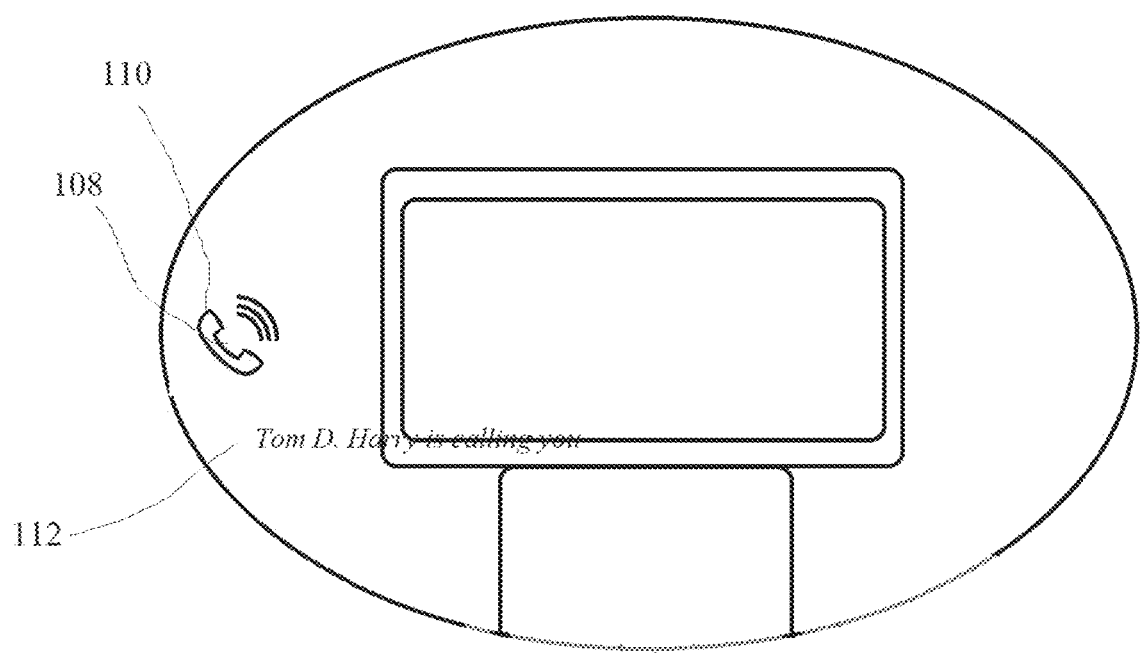
FIG. 7B depicts the displayed in the field of view of the person when an incoming call is received.

In FIG. 7B is depicted the displayed in the field of view of the person when an incoming call is received: indicator 110 has a changed appearance, having three curves and flashing while textual information 112 about the incoming calls is displayed in the field of view by the virtual retinal display module. Textual information 112 partially obscures the real world object that the person is looking at. If the person wants to answer the incoming call, the person swipes left in the real volume corresponding to virtual input area 108, which left swipe is identified as an appropriate manipulation of virtual input area 108 and the action performed is connecting the call. If the person does not want to answer the incoming call, the person swipes right on the real volume corresponding to virtual input area 108, which right swipe is identified as an appropriate manipulation of virtual input area 108 and the action performed is cancelling the incoming call.

In FIG. 7A, when the person wants to make an outgoing call, the person swipes left on virtual input area 108. The left swipe is identified as an appropriate manipulation of virtual input area 108 and the action performed is displaying a second display as depicted in FIG. 7C.

Figure 7C:
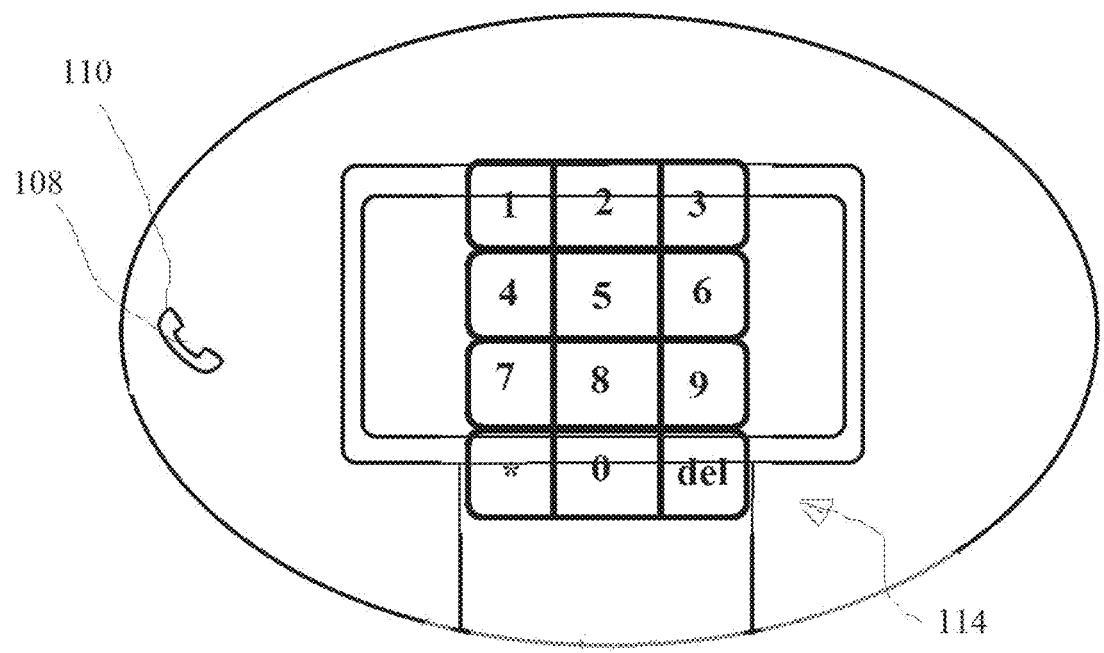
FIG. 7C depicts the display of a twelve-key keyboard in the field of view of a person for dialing a telephone number.
Figure 7D:
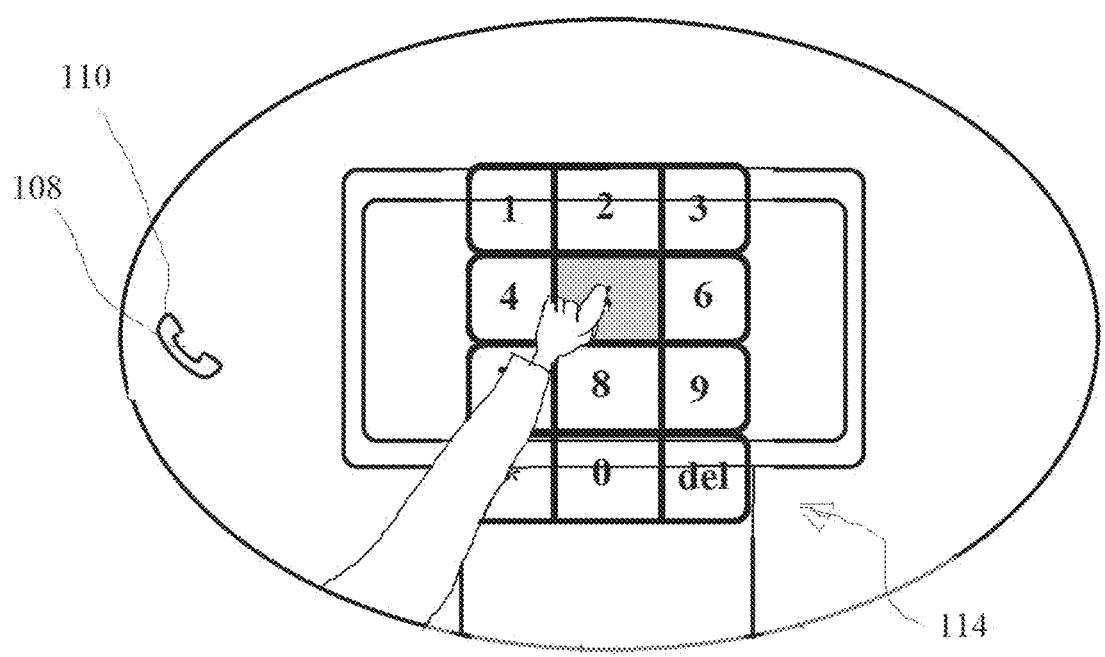
FIGS. 7D and 7E depict the display of a twelve-key keyboard in the field of view of a person for dialing a telephone number, the person dialing by manipulating a real volume corresponding to a virtual input area by indicating with an extended finger (FIG. 7D) and then flexing the finger (FIG. 7E)

In FIG. 7C, the image of a twelve-key keyboard, keypad 114 is displayed in the field of the view by the virtual retinal display module, the outline of each one of the twelve keys of keypad 114 being an indicator of a different virtual input area. To dial, the person moves the right hand closed with a single upraised finger to a virtual input area framed by the outline of a desired key. Image acquisition and processing is continuously performed and, whenever a single upraised finger is identified inside the real volume corresponding to a specific one of the twelve keys, the presence of the upraised finger is identified as an appropriate manipulation of the corresponding virtual input area to cause an action to be taken to change the color of the key to grey, see FIG. 7D.

Figure 7E:
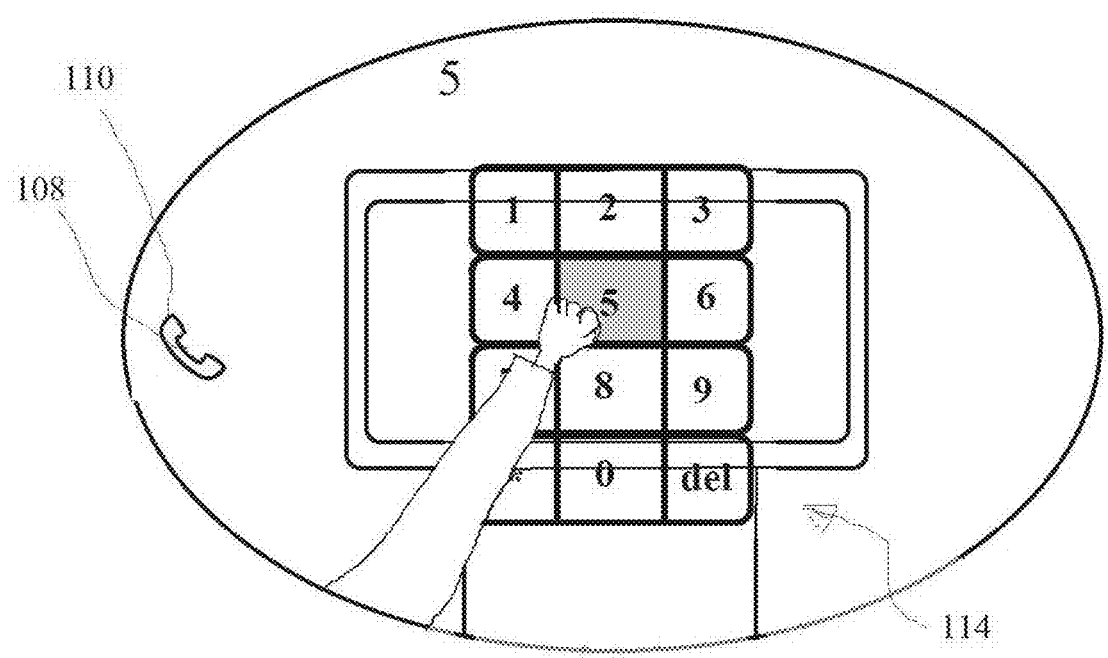

If the person wants to "press" the now grey-colored key, the person lowers the upraised-finger, see FIG. 7E. The lowering of the single finger leading to a closed right hand while the key is colored grey is identified as appropriate manipulation of the virtual input area corresponding to the key which leads to a selection of one of ten digits (0 to 9), an asterisk, or deletion of the previous selected digit or asterisk. Although not depicted for the sake of brevity, the person continues selecting the desired number of digits and, when the correct telephone number as been entered, can choose to dial that number to make a call by "pushing" (motion of the hand perpendicular to the plane of the field of view) or "swiping" virtual input area 108.

Figure 8A:
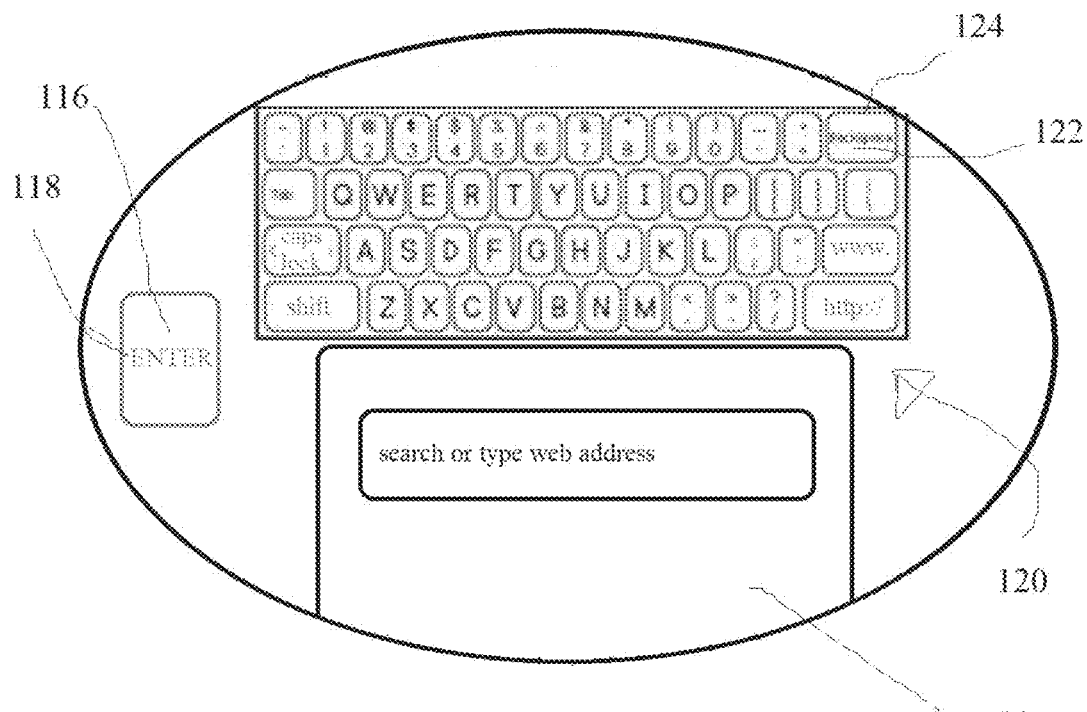
FIGS. 8A and 8B depicts the display of a QWERTY keyboard in the field of view of a person for inputting information to a computer device such as a smartphone or computer.
Figure 8B:
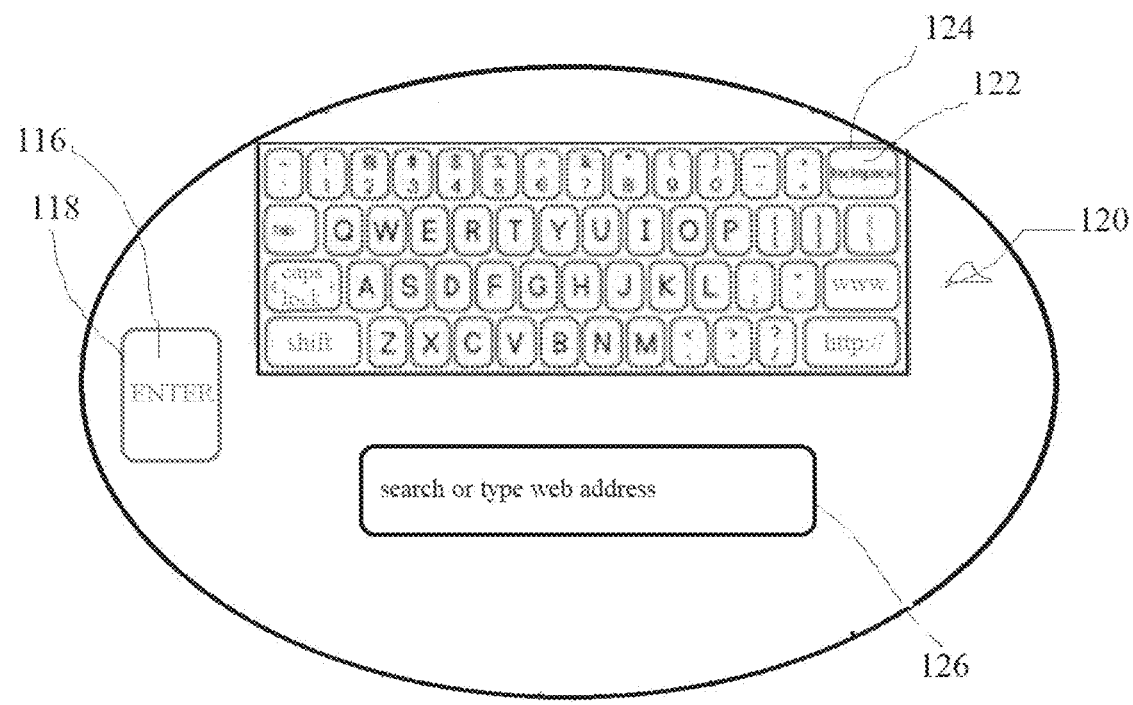

In FIGS. 8A and 8B are depicted the fields of view of a person using an embodiment of the teachings herein having 54 different virtual input areas. Virtual input area 116 is indicated by indicator 118 constituting a grey frame and text "ENTER". The other 53 virtual input areas are arranged in a way and indicated by text and frame indicators so that the virtual input areas together constitute and appear to a person wearing that device as a virtual modified US ANSI QWERTY-keyboard 120. For instance, virtual input area 122 is indicated by indicator 124 which is a grey frame and the text "backspace". For brevity, the other virtual input areas and respective indicators will not be discussed in greater detail: the description here is sufficient for a person having ordinary skill in the art.

In FIG. 8A, the teachings herein are used as an input device for a real prior-art smartphone 44 which is seen in the field of view of the person (for example, as depicted in FIG. 5E). As the user types text using the virtual input areas constituting virtual keyboard 120, the typed characters are displayed on the real screen of real smartphone 44.

In FIG. 8B, the teachings herein are used as an input device for a smartphone or computer, where the virtual retinal display module of the device is used as the display of the smartphone or computer (for example, for modified smartphone 62 depicted in FIG. 5F or for device 72 depicted in FIG. 5G). As the person types text using the virtual input areas constituting virtual keyboard 120, the typed characters appear in a virtual search box 126 that is directly displayed on a user's retina by the virtual retinal display module.

Figure 8C:
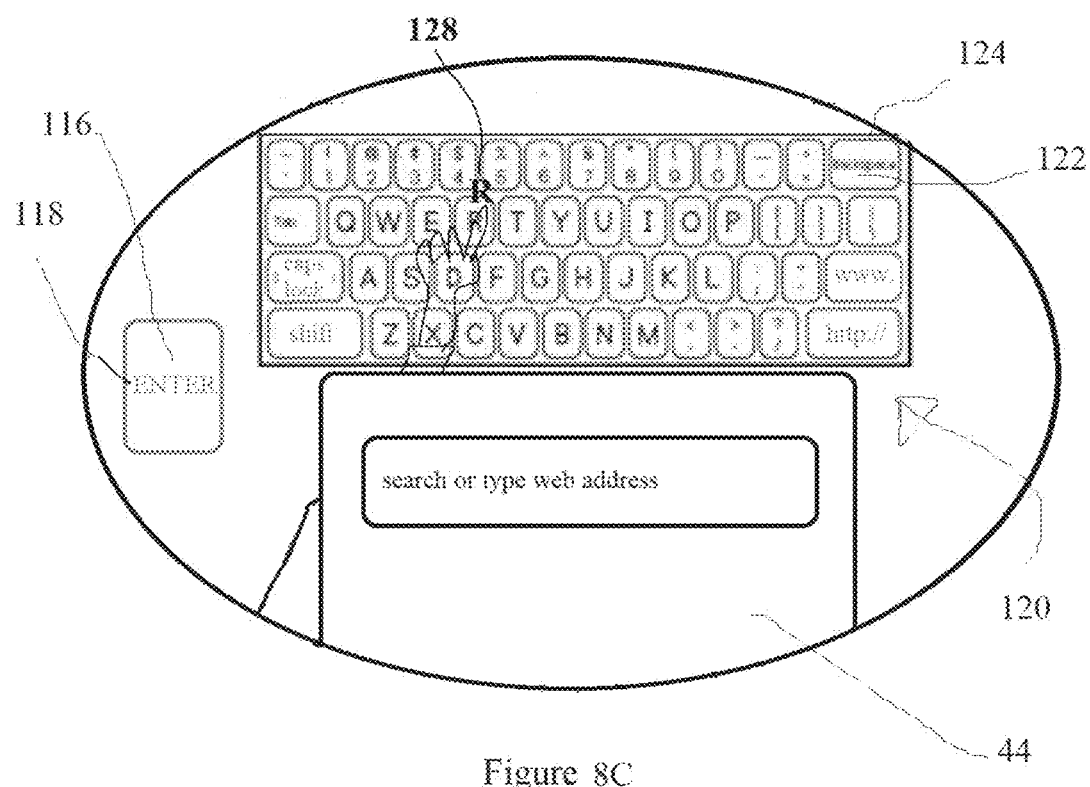
FIG. 8C depicts the display of a QWERTY keyboard in the field of view of a person for inputting information to a computer device such as a smartphone or computer, the person pressing a key by manipulating a real volume corresponding to a virtual input area by indicating with an extended finger.

Analogously to the telephony embodiment discussed in with reference to FIGS. 7, to press a key, of the QWERY keyboard depicted in FIGS. 8A, the person moves the right hand closed with a single upraised finger to a virtual input area framed by the outline of a desired key. Image acquisition and processing is continuously performed and, whenever a single upraised finger is identified inside the real volume corresponding to a specific one of the fifty-four virtual input areas, the presence of the upraised finger is identified as an appropriate manipulation of the corresponding virtual input area to cause an action to be taken to label the tip of the upraised finger with an identifier 128 clearly indicating which key is being pressed, see FIG. 8C.

If the person wants to "press" the identified key, the person lowers the upraised-finger. The lowering of the single finger while the identifier 128 is displayed is identified as appropriate manipulation of the virtual input area corresponding to the key which leads to a selection of one of the characters or functions as known in the art of computer keyboards. Although not depicted for the sake of brevity, the person continues using the virtual QWERTY keyboard 120 in a manner analogous to the use of a real QWERTY keyboard. Importantly, in some instances an appropriate manipulation is the manipulation of two or more different real volumes with two different fingers, for example, a real volume corresponding to the virtual input area corresponding to "shift" and the virtual input area corresponding to "r" to input the letter "R".

Figure 9:
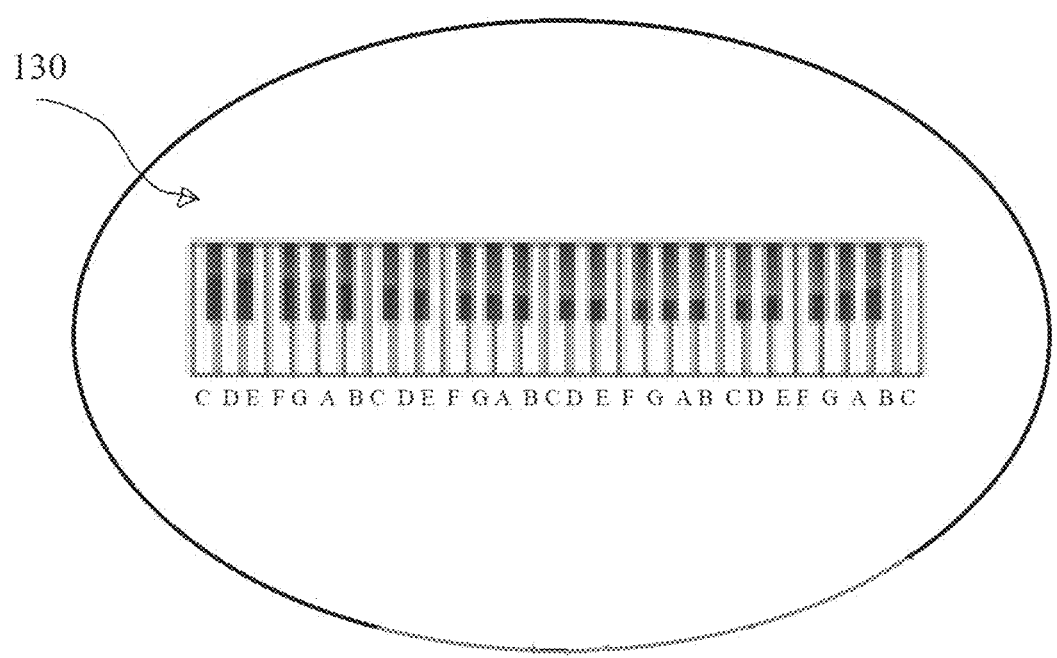
FIG. 9 depicts the display of a 49-key manual (music keyboard) in the field of view of a person for playing a music on a computer device.

In FIG. 9 is depicted the fields of view of a person using an embodiment of the teachings herein to play music on a computer device. The field of view includes forty-nine virtual input areas indicated with indicators arranged and designed to appear to be a 49-key manual 130 so that each key corresponds to a virtual input area. As described above, a user places a finger in a real volume corresponding to a virtual input area that is identified by an indicator that constitutes a key (or simultaneously multiple fingers each in a different such real volume) and the performs an appropriate manipulation by moving the finger tip away, in a motion reminiscent of pressing a key of a piano. Such pressing of a key of keys leads to performance of an appropriate action for example one or more of: recording the pressing of the key in sheet-music format and/or as a music note for future playback and/or producing an audible note corresponding to the pressed key in a way that can be heard by the person and/or other people. In the embodiment depicted in FIG. 9 the virtual input areas are arranged as a 49-key manual. In other similar embodiments, the virtual input areas are arranged in a pattern such as of a 25-key, 37-key, 44-key, 49-key, a 61-key, a 73-key and a 88-key manual.

Figure 10:
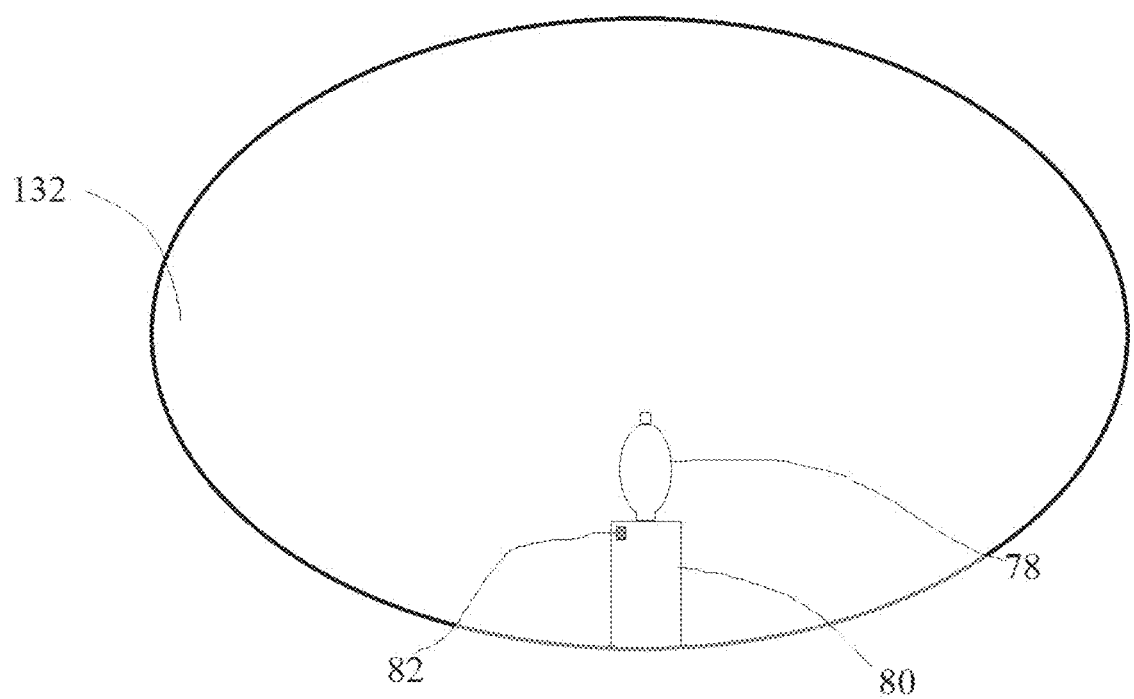
FIG. 10 depicts a display in the field of view of a person using an embodiment of the teachings herein having an virtual input area without an associated indicator.

As discussed above, in some embodiments the location of at least one of the virtual input areas in the field of view is indicated to the person with a visible indicator. In the specific embodiments discussed above with reference to the Figures, all of the virtual input areas appeared to the person with an indicator. In some embodiments, there is at least one virtual input area in the field of view that is not indicated to the person with a visible indicator. In preferred such embodiments, the person knows the location of such a not-indicated virtual input area in the field of view, allowing the person to appropriately manipulate the not-indicated virtual input area. In FIG. 10 is depicted the field of view of a person including a single virtual input area 132 located at the left of the field of view that is not indicated to the person. As with other virtual input areas, when desired the person appropriately manipulates the real volume that corresponds to the not-indicated virtual input area. Such embodiments are useful when it is desired to normally have a non-cluttered field of view. For example, in some embodiments of a device configured for telephony, the normal "first screen" has a virtual input area 110 such as depicted in FIG. 7A, but devoid of an indicator such as 108. When the person wants to make a phone call, they appropriately manipulate the not-indicated virtual input area which leads to display of a keyboard that allows dialing a number and/or calling a prestored contact, see for example FIG. 7C.

Reducing Processing Effort

As noted above, to determine if a specific virtual input area is being manipulated a controller performs image analysis on an image acquired by one or more of the cameras. In some embodiments, for example, to reduce energy use and/or to reduce analysis time and/or for some other reason, image analysis is performed on only a small portion of an acquired image which small portion includes the virtual input area or areas. In some embodiments, the small portion corresponds to not more than 50% of the pixels of an acquired image, not more than 30%, not more than 20% and even not more than 10% of the pixels of an acquired image. In some embodiments, the small portion comprises more than 50% of the pixels corresponding to all of the virtual input areas that are potentially manipulated at the time of image acquisition.

Audible/Tactile Feedback

In some embodiments, the method further comprises an audible and/or tactile feedback, For example, in some embodiments, the method further comprises that when the image processing identifies that the person appropriately manipulated a real volume that corresponds to a virtual input area, a computer further activates a device that generates an audible signal (e.g., a speaker) and/or a tactile signal (e.g., a vibrating element such as known in the art of smartphones).

In some embodiments, the device is further configured to provide audible and/or tactile feedback to a person. In some embodiments, the device includes an audible signal generator (e.g., a speaker) and/or a tactile signal generator (e.g., a vibrating element such as a piezoelectric element known in the art of smartphones) and the controller is configured to activate the audible signal generator and/or the tactile signal generator, for example, when the image processing identifies that the person appropriately manipulated a real volume that corresponds to a virtual input area.

For example, in some embodiments when the device is used to dial a telephone number, when a number is pressed (e.g., when a real volume corresponding to a virtual input area that designates a number is appropriately manipulated). a tone corresponding to the number is generated as known in the art of tone-dialing telephony.

For example, in some embodiments when the device is used to play music such as depicted in FIG. 10, when a key is pressed (e.g., when a real volume corresponding to a virtual input area that designates a key is appropriately manipulated). a tone corresponding to the key generated as known in the art of music.

Input/Output Component for Devices

Above are depicted and discussed embodiments of devices or device components that are configured for communication with a smartphone, allowing the device to function as an input component and, in some embodiments, an output component for a smartphone. In some embodiments, a device or a device component of the techings herein is configured for communication with a device different than a smartphone, for example, a vehicle, a toy, a table, a laptop computer and a desktop computer, allowing the device to function as an input component and, in some embodiments, an output component for such a device.

Wireless Communication

Above are depicted devices such as device 34 that include a class 4 Bluetooth® transceiver 36. In some embodiments, one or more such devices include a Bluetooth® transceiver having higher-power than Bluetooth® transceiver 36, in some embodiments a class 3 Bluetooth® transceiver emitting a maximum of 1 mW and having a maximal range of ~1 m, in some embodiments a class 2 Bluetooth® transceiver emitting a maximum of 2.5 mW and having a maximal range of ~10 m, in some embodiments a class 1.5 Bluetooth® transceiver emitting a maximum of 10 mW and having a maximal range of ~20 m and in some embodiments a class 1 Bluetooth® transceiver emitting a maximum of 100 mW and having a maximal range of ~100 m.

In some embodiments, wireless communication is provided by a technology and corresponding components different from Bluetooth®.

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof.

As used herein, the indefinite articles "a" and "an" mean "at least one" or "one or more" unless the context clearly dictates otherwise.

As used herein, when a numerical value is preceded by the term "about", the term "about" is intended to indicate +/−10%.

As used herein, a phrase in the form "A and/or B" means a selection from the group consisting of (A), (B) or (A and B). As used herein, a phrase in the form "at least one of A, B and C" means a selection from the group consisting of (A), (B), (C), (A and B), (A and C), (B and C) or (A and B and C).

Embodiments of methods and/or devices described herein may involve performing or completing selected tasks manually, automatically, or a combination thereof. Some methods and/or devices described herein are implemented with the use of components that comprise hardware, software, firmware or combinations thereof. In some embodiments, some components are general-purpose components such as general purpose computers or digital processors. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A wearable virtual retinal display (VRD) device configured to be worn by a person, comprising:
   a. a frame securable to a person's head; said frame having transparent screens allowing said person to see a surrounding space:
   b. a VRD module comprising a gaze tracker physically associated with said frame; said VRD module configured for projecting a visible image on at least one retina of said person;
   c. at least one camera physically associated with said frame having a lens directed at said surrounding real space in front of said person, configured for acquiring a series of images of said surrounding space in front of said person;
   d. a controller configured to control said VRD module and said at least one camera;
   e. a power source physically-associated with said frame to provide power to said VRD module and to said at least one camera,
      wherein said controller is further configured to cause:
      i. said VRD module to project at least one indicator of a location of at least one virtual input area at a fixed location on said at least one retina of said person so that said person sights said at least one indicator at a fixed area of a person's field of view overlayed over said surrounding real space, wherein said at least one virtual input area is within an angle of 20° laying in XZ plane and an angle of 20° laying in YZ plane, where said XZ and YZ planes are defined by axes X, Y, Z having an origin at an eye pupil; and a distance along said axis Z is a distance to said virtual input area;
      ii. said at least one camera to acquire a series of images of said surrounding real space corresponding to said person's field of view; and
      iii. said controller to: receive said series of images from said at least one camera; detect an action performed by at least one finger of said person's hand within said series of images when said at least one finger is positioned within said at least one indicator; and perform a predetermined operation related to said action performed by said at least one finger of said person's hand within said at least one indicator.

2. The device of claim 1, wherein said at least one indicator is projected on both retinae of the person in a monoscopic manner.

3. The device of claim 1, wherein said at least one indicator is projected on both retinae of the person in a stereoscopic manner.

4. The device of claim 1, wherein at least one said indicator is at least one member of the group consisting of a distinct color, a glyph, an icon, text and a frame surrounding a corresponding virtual input area.

5. The device of claim 1, wherein said at least one virtual input area is perceived by the person as being arranged in a specific arrangement selected from the group consisting of a list; a table, a keyboard pattern and a manual pattern.

6. The device of claim 1, wherein said at least one virtual input area comprises at least two said virtual input areas and wherein at least two neighboring virtual input areas are spaced apart from each other.

7. The device of claim 1, wherein said controller is configured to identify a member within said surrounding real space; said member is selected from the group consisting of: a predetermined visual element in within said series of image frames;
   a predetermined motion in at least one image sequence within said series of images, and a combination thereof.

8. The device of claim 1, wherein said controller is further configured to determine at least one distance to a physical object located within said series of images of said surrounding real space captured by said at least one camera.

9. The device of claim 8, wherein said controller is further configured to determine a displacement of said physical object located in said surrounding real space by comparing said at least one distance at two different times.

10. The device of claim 1, wherein, after identifying said at least one finger of said person's hand within said at least one virtual input area, said controller is further configured to change an appearance of said at least one indicator.

11. The device of claim 1, further comprising a telephony module physically associated with said frame, the device being a telephony device.

12. A method of inputting information, said method comprising steps of:
   a. providing a wearable virtual retinal display (VRD) device; said VRD device comprising:
      i. a frame securable to a person's head; said frame having transparent screens allowing said person to see a surrounding space:

ii. a VRD module comprising a gaze tracker physically associated with said frame; said VRD module configured for projecting a visible image on at least one retina of said person;
iii. at least one camera physically associated with said frame having a lens-front directed at said surrounding real space in front of said person, configured for acquiring a series of images of said surrounding space in front of said person;
iv. a controller configured to control said VRD module and said at least one camera; and
v. a power source physically-associated with said frame to provide power to said VRD module and to said at least one camera, said controller is further configured to cause:
1. said VRD module to project at least one indicator of a location of at least one virtual input area at a fixed location on said at least one retina of said person so that said person sights said at least one indicator at a fixed area of a person's field of view overlayed over said surrounding real space, wherein said at least one virtual input area is within an angle of 20° laying in XZ plane and an angle of 20° laying in YZ plane, where said XZ and YZ planes are defined by axes X, Y, Z having an origin at an eye pupil; and a distance along said axis Z is a distance to said virtual input area;
2. said at least one camera to acquire a series of images of said surrounding real space corresponding to said person's field of view; and
3. said controller to receive said series of images from said at least one camera, detect an action performed by at least one finger of said person's hand within said series of images when said at least one finger is positioned within said at least one indicator and perform a predetermined operation related to said action performed by by said at least one finger of said person's hand within said at least one indicator;

b. securing said VRD device to said person's head;
c. acquiring said series of images of said surrounding space by said at least one camera;
d. detecting said at least one finger of said person's hand within said series of images when said at least one finger is positioned within said at least one indicator; and
e. performing said predetermined operation related to said action performed by said at said at least one finger of said person's hand within said least one indicator.

13. A wearable virtual keyboard comprising:
a. a frame securable to a person's head; said frame having transparent screens allowing said person to see a surrounding space;
b. a VRD module comprising a gaze tracker physically associated with said frame; said VRD module configured for projecting a visible image on at least one retina of said person;
c. at least one camera physically associated with said frame having a lens directed at said surrounding real space in front of said person, configured for acquiring a series of images of said surrounding space in front of said person;
d. a controller configured to control said VRD module and said at least one camera; and
e. a power source physically-associated with said frame to provide power to said VRD module and to said at least one camera;

wherein said controller is further configured to cause:
i. said VRD module to project a keyboard image comprising a plurality of virtual input areas at fixed locations on said at least one retina of said person so that said person sights said plurality of virtual input areas at a fixed area of a person's field of view overlayed over said surrounding real space;
ii. said at least one camera to acquire a series of images of said surrounding real space corresponding to said person's field of view; and
iii. said controller to: receive said series of images from said at least one camera, detect an action performed by at least one finger of said person's hand within said series of images when said at least one finger is positioned within at least one virtual input area of said plurality of virtual input areas, and perform at least one predetermined operation related to said action performed by said at least one finger of said person's hand within said at least one virtual input area.

* * * * *